US007123845B2

(12) United States Patent
Matsuyama

(10) Patent No.: US 7,123,845 B2
(45) Date of Patent: Oct. 17, 2006

(54) RECEIVING APPARATUS WITH WAVEFORM DEGRADATION COMPENSATING FUNCTION

(75) Inventor: Toru Matsuyama, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 700 days.

(21) Appl. No.: 10/359,142

(22) Filed: Feb. 6, 2003

(65) Prior Publication Data

US 2004/0037572 A1 Feb. 26, 2004

(30) Foreign Application Priority Data

Aug. 22, 2002 (JP) ............................. 2002-241966

(51) Int. Cl.
*H04B 10/06* (2006.01)
*H04B 10/18* (2006.01)
*G06F 5/00* (2006.01)

(52) U.S. Cl. ........................... 398/208; 398/7; 398/34; 398/43; 398/202; 702/69; 702/66; 702/67; 702/68; 702/70; 702/71

(58) Field of Classification Search ................ 398/202, 398/208, 34, 43; 702/66–71
See application file for complete search history.

(56) References Cited

U.S. PATENT DOCUMENTS

| 5,430,568 | A |   | 7/1995  | Little et al. ................. 359/124 |
| 5,935,068 | A | * | 8/1999  | Zhu et al. .................... 600/443 |
| 5,999,289 | A |   | 12/1999 | Ihara et al. .................. 398/147 |
| 6,081,362 | A |   | 6/2000  | Hatakeyama et al. ....... 359/189 |
| 6,307,868 | B1 | * | 10/2001 | Rakib et al. ................. 370/485 |
| 6,367,879 | B1 | * | 4/2002  | Chen et al. ............. 297/423.25 |
| 6,694,273 | B1 | * | 2/2004  | Kurooka et al. ............... 702/69 |
| 6,871,024 | B1 |   | 3/2005  | Nishimoto et al. ......... 398/159 |
| 6,959,154 | B1 |   | 10/2005 | Gnauck et al. ............. 398/159 |
| 2002/0048062 | A1 | * | 4/2002 | Sakamoto et al. .......... 359/124 |
| 2002/0123851 | A1 |   | 9/2002 | Kurooka et al. .............. 702/69 |

FOREIGN PATENT DOCUMENTS

EP 0 837 570 4/1998

(Continued)

OTHER PUBLICATIONS

Japanese Patent Office Notice of Reasons for Rejection dated May 30, 2006 for Japanese Patent Application No. 2002-241966.

(Continued)

*Primary Examiner*—Kenneth Vanderpuye
*Assistant Examiner*—Danny Wai Lun Leung
(74) *Attorney, Agent, or Firm*—Staas & Halsey LLP

(57) ABSTRACT

A receiving apparatus comprises a first waveform degradation compensating unit, a second waveform degradation compensating unit, a received waveform measuring unit for measuring waveform data on a received signal, a control unit for controlling compensation characteristics of the first and second waveform degradation compensating units to minimize a difference between frequency data obtained by converting the obtained received waveform data into a frequency domain and frequency data on a reference waveform free from waveform degradation, and time-constant generating units for making a difference in compensation characteristic control speed between the first and second waveform degradation compensating units. This realizes high-accuracy compensation for waveform degradation of a received signal stemming from chromatic dispersion, polarization mode dispersion or the like without employing a dispersion compensation fiber or a polarization maintaining fiber.

18 Claims, 19 Drawing Sheets

FOREIGN PATENT DOCUMENTS

| | | |
|---|---|---|
| EP | 0 912 001 | 4/1999 |
| JP | 7-221705 | 8/1995 |
| JP | 8-288913 | 11/1996 |
| JP | 10-126351 | 5/1998 |
| JP | HEI 11-122173 | 4/1999 |
| JP | 2000-115077 | 4/2000 |
| JP | 2002-208892 | 7/2002 |
| JP | 2002-223190 | 8/2002 |
| JP | 2002-261692 | 9/2002 |

OTHER PUBLICATIONS

Japanese Patent Office Notice of Reasons for Rejection dated May 30, 2006 for Japanese Patent Application No. 2002-241966.

European Search Report dated Jun. 26, 2006 for corresponding European Patent Application No. 03003588.5.

European Search Report dated Jun. 26, 2006 for corresponding European Patent Application No. 03003588.5.

* cited by examiner

REFERENCE WAVEFORM FOR BIT RATE: 10 Gb/s

GROUP DELAY COMPONENT OF REFERENCE WAVEFORM

GROUP DELAY COMPONENT OF DEGRADED WAVEFORM

FREQUENCY COMPONENT (AMPLITUDE) OF REFERENCE WAVEFORM (FREQUENCY COMPONENT (AMPLITUDE) OF DEGRADED WAVEFORM

REFERENCE WAVEFORM

DEGRADED WAVEFORM

CORRECTION CHARACTERISTIC (AMPLITUDE)

CORRECTION CHARACTERISTIC (GROUP DELAY)

FREQUENCY COMPONENT (AMPLITUDE) OF EQUALIZED WAVEFORM

GROUP DELAY COMPONENT OF EQUALIZED WAVEFORM

EQUALIZED WAVEFORM AFTER APPLICATION OF CORRECTION CHARACTERISTIC TO DEGRADED WAVEFORM

RECEIVING APPARATUS WITH WAVEFORM DEGRADATION COMPENSATING FUNCTION

BACKGROUND OF THE INVENTION (1) Field of the Invention

The present invention relates to a receiving apparatus having a waveform degradation compensating function, and more particularly to a technique suitable for compensation for waveform degradation an optical signal suffers due to an optical transmission line.

(2) Description of the Related Art

FIG. 20 is a block diagram showing one example of the existing optical transmission system. In FIG. 20, an optical transmission system 100 is made up of an optical transmitting apparatus 200, an optical amplification repeater 300, and an optical receiving apparatus 400, with an optical signal sent from the optical transmitting apparatus 200 being transmitted through an optical transmission line (optical fiber) 500 to the optical receiving apparatus 400 while being repeated/amplified properly in the optical repeater 300. Incidentally, although only one optical repeater 300 is illustrated in FIG. 20, naturally, two or more optical repeaters are employable, or no need therefore arises, depending on an optical signal transmission distance.

In general, in such an optical transmission system 100, for example, for a long-distance/large-capacity optical transmission represented by 10 Gb/s (giga bit/second) or 40 Gb/s, the waveform degradation of a received signal occurs remarkably due to "chromatic dispersion", "polarization mode dispersion" or the like, which causes the deterioration of the transmission characteristic such as a reception sensitivity characteristic of an optical receiver 402 leading to the reduction of an aperture of an eye pattern (which will be referred to hereinafter as an "eye aperture") of a received waveform so that limitation is imposed on transmission rate or transmission distance. In FIG. 20, reference numeral 403 designates a signal processing unit for receiving data and clock from the optical receiver 402 to conduct predetermined digital signal processing.

In this case, the "chromatic dispersion", resulting from the material dispersion or the structure dispersion of an optical fiber itself, signifies a property that the propagation velocity in the interior of the optical fiber has a wavelength dependency. Concretely, the property is that the long-wavelength side around the zero dispersion wavelength delays while the short-wavelength side advances. The influence thereof depends upon the transmission distance, the characteristic of an optical fiber put to use, the variation of environmental temperature or the like and varies therewith.

On the other hand, the "polarization mode dispersion" signifies the property that, since the cross section of an optical fiber is not a true circle but having an elliptic configuration, two polarization principal axes (TE mode, TM mode) perpendicular to each other makes a difference in group velocity (propagation velocity) of an optical signal. The influence thereof depends upon the variation of stress applied to the optical fiber, the manufacturing condition and installation condition of the optical fiber, the variation of the environmental temperature or the like and varies therewith.

The transmission characteristic degradation stemming from the "polarization mode dispersion" has already been formulated, and the degradation degree P (dB) of the transmission characteristic due to the "polarization mode dispersion" is determined by an input power ratio $\gamma$ ($0<\gamma<1$) of an optical signal with respect to two polarization principal axes of an optical transmission line 500 and the polarization dispersion value $\Delta\tau$ of the entire optical transmission line 500, and is given according to the following equation (1). In this connection, the influence thereof is in proportion to the square of the transmission rate and is in proportion to the root (square root) of the transmission distance.

$$P \propto \gamma(1-\gamma)\Delta\tau^2 \qquad (1)$$

In addition, so far, a dispersion shift fiber (DSF) in which the zero dispersion wavelength is shifted to 1.55 μm band has been used as the optical transmission line 500, or a dispersion compensation fiber (DCF) 401a designed to have a chromatic dispersion characteristic reverse to the chromatic dispersion has been located at the former stage of the optical receiver 402. This compensates for the waveform degradation stemming from the optical transmission line 500 to enlarge the eye aperture of a received waveform.

On the other hand, with respect to the degradation due to the "polarization mode dispersion", a polarization maintaining fiber (PMF) 401b designed such that, when a linear polarization light is incident in a state where its polarization axis is aligned with the X axis (or the Y axis) of an optical fiber, the light propagates in the optical fiber in a state where the polarization state is maintained and only the X polarization light (or, the Y polarization light) is obtainable even at its outgoing end is placed at the former stage of the optical receiver 402. This reduces the "polarization mode dispersion" stemming from the optical transmission line 500.

However, in general, the degree of the wavelength degradation stemming from the "chromatic dispersion" increases with an increase in number of wavelengths to be multiplexed, and the degree of the waveform degradation originating from the "polarization mode dispersion" increases in proportion to the transmission rate or the transmission distance and, therefore, in the above-mentioned existing optical transmission system 100, there is a need to employ a different dispersion compensation fiber 401a or polarization maintaining fiber 401b for each optical transmission distance for setting up a waveform degradation degree range the optical receiver 402 permits.

This increases the number of kinds and using frequency of the needed dispersion compensation fiber 401a or polarization maintaining fiber 401b, thereby increasing the cost at the system construction or the management cost. Thus, this is unfeasible and lacks the extensibility (applicability) and the flexibility at the system reconstruction or the like.

Moreover, since the dispersion compensation fiber 401a or the polarization maintaining fiber 401b requires a high cost, and because of suffering from a large insertion loss, there is a need to employ a multistage configuration of optical amplification repeaters 300. Still moreover, in a recent very-long-distance/large-capacity optical transmission system represented by 10 Gb/s or 40 Gb/s, since the wavelength spacing becomes extremely short owing the WDM technique, difficulty is experienced in disregarding the variation of the wavelength characteristic caused by the above-mentioned environmental temperature variation.

For this reason, in the case of the very-high-rate optical transmission such as 10 Gb/s or 40 Gb/s, the mere employment of the dispersion compensation fiber 401a or the polarization maintaining fiber 401b does not reach the solution to the lack of flexibility of the system including cost and sufficient waveform degradation compensation of a received signal.

SUMMARY OF THE INVENTION

The present invention has been developed in consideration of these problems, and it is therefore an object of the invention to provide a receiving apparatus with a waveform degradation compensating function, capable of realizing the compensation for the waveform degradation of a received signal stemming from chromatic dispersion, polarization mode dispersion or the like with high accuracy without employing a dispersion compensation fiber or polarization maintaining fiber.

For this purpose, a receiving apparatus with a waveform degradation compensating function according to the present invention is characterized by comprising the following means:

(1) first waveform degradation compensating means of a compensation characteristic variable type which is capable of compensating for waveform degradation a received signal suffers;

(2) second waveform degradation compensating means of a compensation characteristic variable type which is capable of further compensating for waveform degradation of an output of the first waveform degradation compensating means;

(3) received waveform measuring means for measuring waveform data on the received signal (which will be referred to hereinafter as "received waveform data");

(4) control means for controlling compensation characteristics of the first and second waveform degradation compensating means so that a difference between frequency data obtained by converting the received waveform data, acquired by the received waveform measuring means, into a frequency domain and frequency data on a reference waveform free from waveform degradation reaches a minimum; and (5) time-constant generating means for making a difference between a speed of the control of the compensation characteristic of the first waveform degradation compensating means by the control means and a speed of the control of the compensation characteristic of the second waveform degradation compensating means by the control means.

In this arrangement, it is also appropriate that the time-constant generating means is composed of a first time-constant generating circuit having a first time constant and a second time-constant generating circuit having a second time constant different from the first time constant, and the first time-constant generating circuit is provided between the first waveform degradation compensating means and the control means while the second time-constant generating circuit is provided between the second waveform degradation compensating means and said control means.

In addition, it is also appropriate that the aforesaid received waveform measuring means is composed of a first received waveform measuring circuit for measuring first received waveform data from an output of the first waveform degradation compensating means and a second received waveform measuring circuit for measuring second received waveform data from an output of the second waveform degradation compensating means while the aforesaid control means is composed of a first control circuit for controlling the compensation characteristic of the first waveform degradation compensating means so that a difference between frequency data obtained by converting the first received waveform data, acquired by the first received waveform measuring circuit, into a frequency domain and frequency data on a reference waveform free from waveform degradation reaches a minimum and a second control circuit for controlling the compensation characteristic of the second waveform degradation compensating circuit so that a difference between frequency data obtained by converting the second received waveform data, acquired by the second received waveform measuring circuit, into a frequency domain and frequency data on a reference waveform free from waveform degradation reaches a minimum.

Furthermore, a receiving apparatus with a waveform degradation compensating function according to the present invention is characterized by comprising the following components:

(1) a demultiplexing unit for receiving a wavelength-multiplexed optical signal, produced by multiplexing a plurality of kinds of wavelengths, from an optical transmission line to demultiplex the wavelength-multiplexed optical signal according to wavelength;

(2) optical waveform degradation compensating means of a compensation characteristic variable type capable of compensating for waveform degradation the wavelength-multiplexed optical signal suffers;

(3) a plurality of electric waveform degradation compensating means of a compensation characteristic variable type provided with respect to a specified wavelength of at least one wave of optical signals obtained by the demultiplexing in the demultiplexing unit and capable of compensating for waveform degradation a received signal suffers after photoelectric conversion of the optical signal;

(4) received waveform measuring means for measuring waveform data on the received signal (which will be referred to hereinafter as "received waveform data");

(5) control means for individually controlling compensation characteristics of the optical waveform degradation compensating means and the electric waveform degradation compensating means so that a difference between frequency data obtained by converting the received waveform data, acquired by the received waveform measuring means, into a frequency domain and frequency data on a reference waveform free from waveform degradation reaches a minimum; and (6) time-constant generating means for making a difference between a speed of the control of the compensation characteristic of the optical waveform degradation compensating means by the control means and a speed of the control of the compensation characteristic of the electric waveform degradation compensating means by the control means.

It is also possible that the aforesaid received waveform measuring means is composed of the following parts:

(1) an equivalent-time sampling unit for equivalent-time-sampling the received signal to acquire a plurality of wave-height data on the received signal;

(2) a waveform data recording unit for recording, as received waveform data, the wave-height data acquired by the equivalent-time sampling unit; and (3) a time-weighting unit for time-weighting sampling timings in the equivalent-time sampling unit to make wave-height data sampling timings have dense and sparse conditions.

Accordingly, the received apparatus with the waveform degradation compensating function according to the present invention can offer the following effects and advantages.

(1) A waveform degradation degree (eye aperture) of a received signal is detected and compensated for (enlarged) in a plurality of steps by controlling the compensation characteristics of the first and second waveform degradation compensating means, thereby enlarging the waveform degradation compensable range in a receiving apparatus. This enable realizing high-accuracy compensation for the waveform degradation stemming from the chromatic dispersion, the polarization mode dispersion or the like without employing a dispersion compensation fiber or a polarization maintaining fiber. In consequence, the extensibility (applicability) and flexibility of the optical transmission system, including cost, are improvable.

(2) Stable compensation control is achievable by making a difference in compensation characteristic control with respect to the first and second waveform degradation compensating means. This enables not only the compensation for the waveform degradation having any speed variation but also the reduction of the frequency data difference calculation processing in the control means.

(3) Compensation can be made in a manner that an actual waveform degradation degree of a received signal is detected in real time. Therefore, for example, in very-high-rate optical transmission exceeding 10 Gb/s, even in a case in which the polarization mode dispersion characteristic or chromatic dispersion characteristic of an optical transmission line varies due to a minute external factor such as temperature variation to fluctuate the waveform degradation stemming from the polarization mode dispersion or chromatic dispersion the received signal encounters, the catch-up with this fluctuation is feasible.

(4) The control means can univocally determine the optimum frequency characteristic in each of the waveform degradation compensating means to minimize the difference in compensation characteristic. Therefore, for example, unlike a case in which the bit error rate (BER) or the like of a received signal is observed to monitor the quality of the received signal for implementing the compensation control so that that quality satisfies a predetermined quality, this eliminates the need for the sweep operation for obtaining the optimum frequency characteristic in each of the waveform degradation compensating means, and enables fast and secure compensation control.

(5) The received waveform measuring means time-weights the sampling timings for wave-height data according to the degree of waveform degradation to produce irregularities of the sampling timings. This can certainly realize high-accuracy compensation according to the degree of waveform degradation and, because there is no need to increase the number of sampling timings as a whole, can reduce the processing speed, memory area and others necessary for the frequency data difference calculation processing in the control means.

DESCRIPTION OF THE PREFERRED EMBODIMENTS

An embodiment of the prevent invention will be described hereinbelow with reference to the drawings.

(A) Description of Basic Mode

Figure 1:
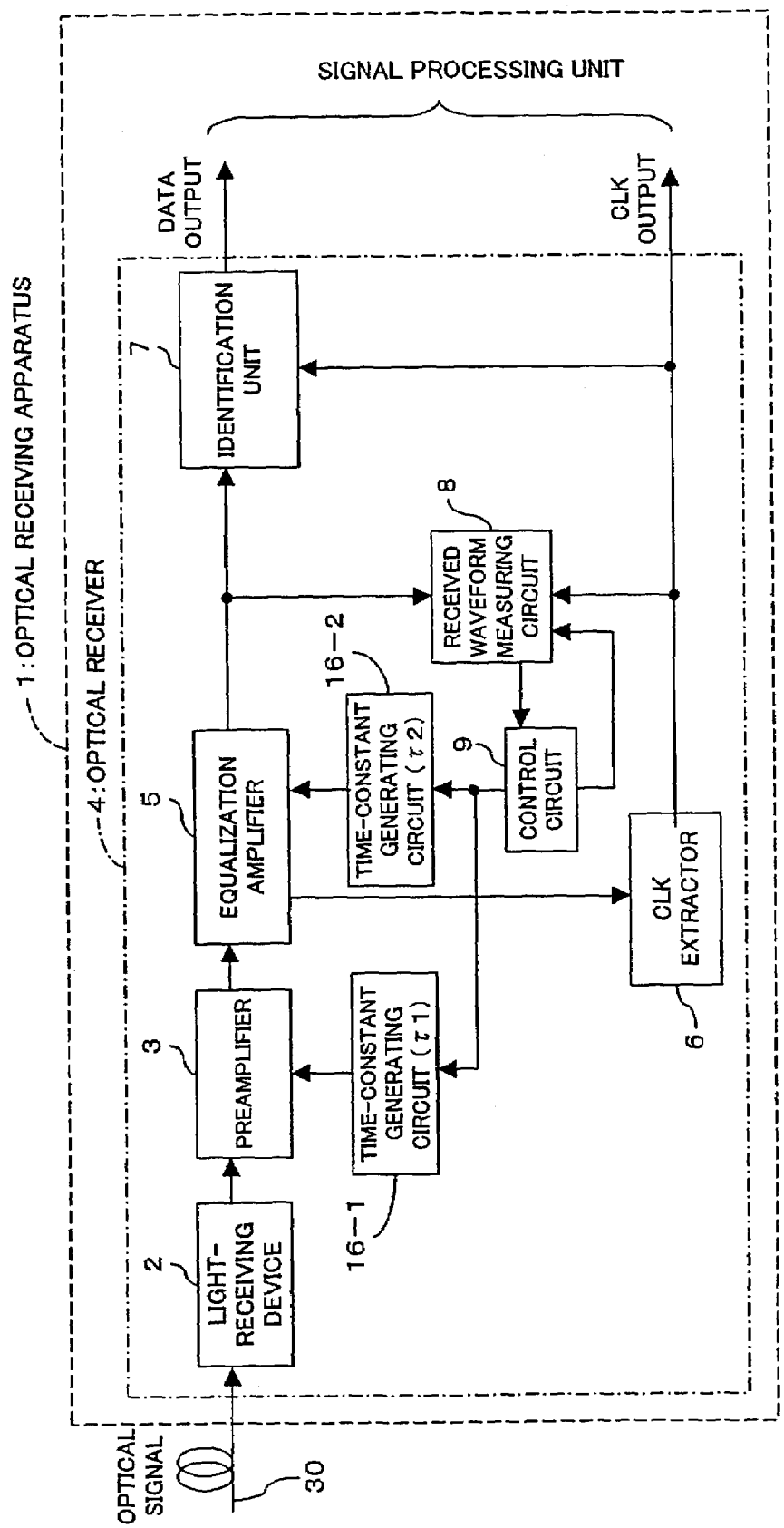
FIG. 1 is a block diagram showing a basic mode of an essential part of an optical receiving apparatus according to an embodiment of the present invention.

FIG. 1 is a block diagram showing a basic mode of an essential part of an optical receiving apparatus according to an embodiment of the present invention. In FIG. 1, an optical receiving apparatus 1 includes, as an optical receiver 4, a light-receiving device 2, a preamplifier 3, an equalization amplifier 5, a clock extractor 6, an identification unit 7, a received waveform measuring circuit 8, a control circuit 9, a first time-constant generating circuit 16-1 (first time constant $\tau 1$) and a second time-constant generating circuit 16-2 (second time constant $\tau 2$).

In this configuration, the light-receiving device 2 is for receiving an optical signal transmitted through an optical transmission line 30 (each of SMF and DSF is applicable thereto) to convert it into a current signal, and the preamplifier 3 is for amplifying an output of the light-receiving device 2 to convert the current signal into a voltage signal. In this embodiment, the preamplifier 3 has a variable frequency/phase characteristic as a compensation characteristic for waveform degradation the received signal suffers in the optical transmission line 30 and also functions as a (first) waveform degradation compensating circuit (electric waveform degradation compensating means) capable of adaptively equalizing the waveform degradation mainly stemming from the "polarization mode dispersion" in the optical transmission line 30 with that characteristic being controlled by the control circuit 9.

Figure 3:
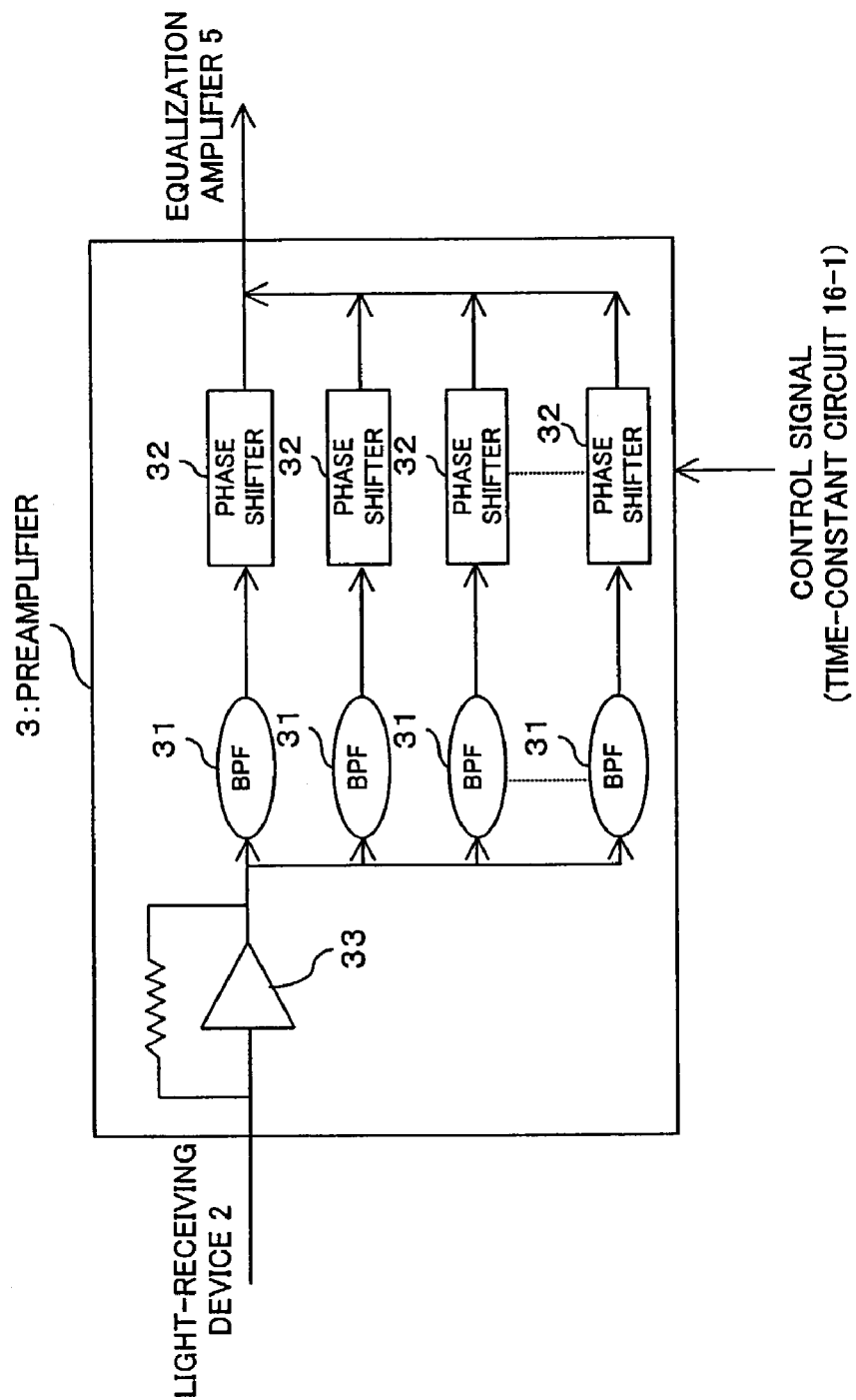
FIG. 3 is a block diagram showing a configuration of a preamplifier shown in FIG. 1.

Therefore, for example, as FIG. 3 shows, the preamplifier 3 is composed of an amplifier 33 for amplifying an output of the light-receiving device 2, a plurality of band-pass filters (BPFs) 31 having, as passbands, a plurality of bands obtained by dividing the frequency band of the received signal, respectively, and a plurality of phase shifters 32 each capable of implementing phase shift (group delay) control on each of the outputs (input signals) of these BPFs 31.

In addition, the phases of these phase shifters 32 are individually controlled to give a different group delay to the received signal for each of the passbands (which will be referred to hereinafter as "divided bands" of the BPFs 31, thus adjusting the frequency characteristic (compensation characteristic) of the preamplifier 3 properly. This frequency characteristic variable preamplifier 3 can also have the same arrangement as that of the equalization amplifier 5 mentioned below.

The equalization amplifier (second waveform degradation compensating circuit; electric waveform degradation compensating means) 5 has a variable frequency/phase characteristic as a compensation characteristic for waveform degradation the received signal encounters in the optical transmission line 30, and is capable of adaptively equalizing (compensating for) the waveform degradation mainly stemming from the "chromatic dispersion" in the optical transmission line 30 with that characteristic being controlled by the control circuit 9.

That is, this optical receiver 4 has a capability to make the compensation on the received signal after the photoelectric conversion by the light-receiving device 2 in two stages: the preamplifier 3 and the equalization amplifier 5. In this embodiment, the "frequency characteristic", in a wide sense, includes both the amplitude component and phase component in a frequency domain (signifying the frequency/phase characteristic), and the "frequency data" includes both data on an amplitude component and data on a phase component in the frequency domain.

Figure 4:
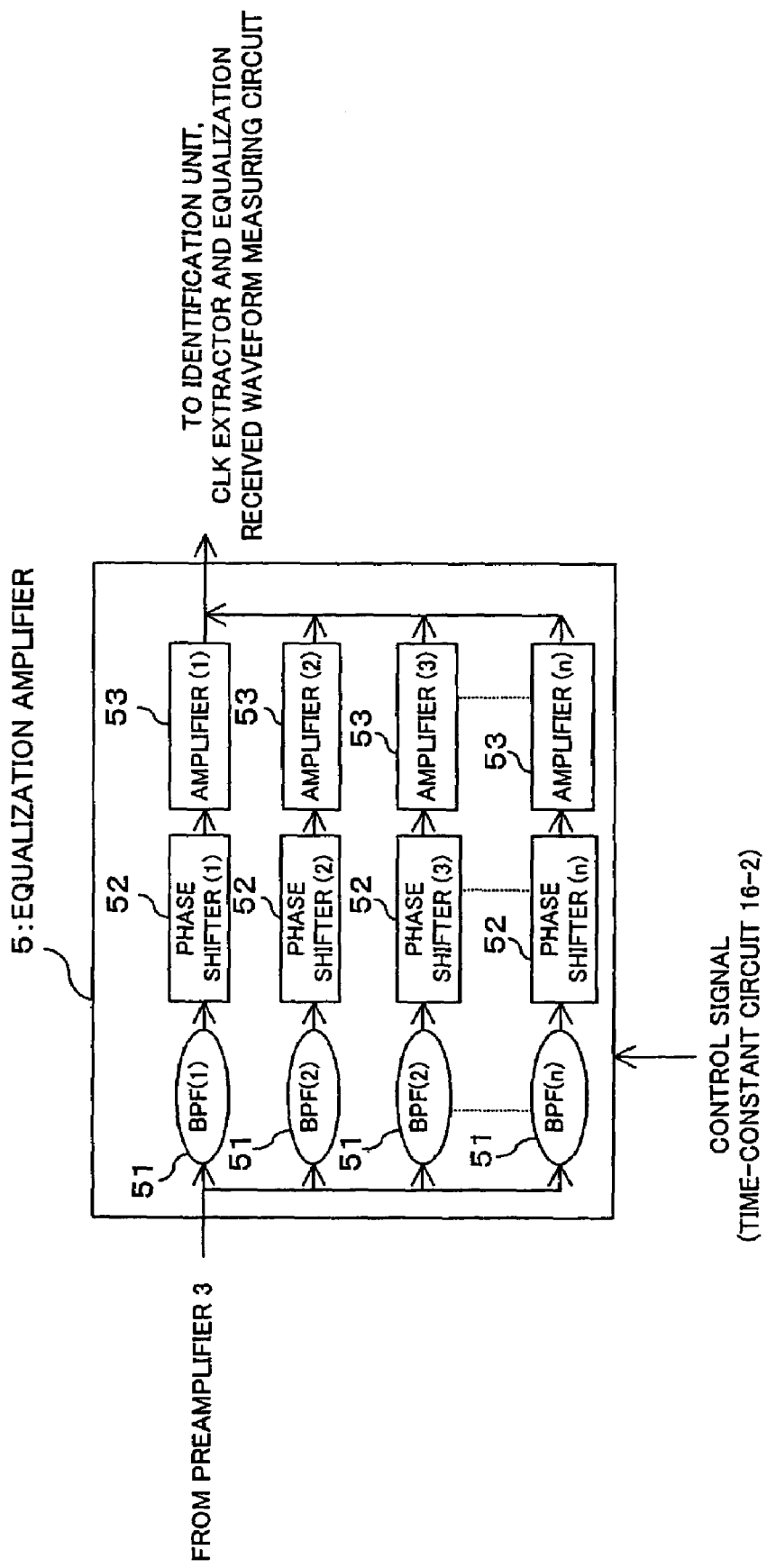
FIG. 4 is a block diagram showing a configuration of an equalization amplifier shown in FIG. 1.

Accordingly, for example, as FIG. 4 shows, the aforesaid equalization amplifier 5 is composed of a plurality of band-pass filters (BPFs) 51 respectively having, as passbands, a plurality of bands obtained by the division of the frequency band of the received signal, a plurality of phase shifters 52 capable of carrying out the phase (group delay) control on each of the outputs (input signals) of these BPFs 51, and a plurality of gain variable amplifiers 53 (or variable attenuators are also acceptable) connected in series to the outputs of these phase shifters 52, respectively, and capable of amplifying the outputs (input signals) thereof. Incidentally, the positions of the phase shifters 52 and the amplifiers 53 are interchangeable with each other.

That is, a pair of each of the phase shifters 52 and each of the amplifiers 53 functions as a phase and gain control circuit capable of implementing the phase control and the gain control on each of the outputs of the BPFs 51 and, therefore, the equalization amplifier in this embodiment individually controls the phase of each of the phase shifters 52 and the gain of each of the amplifiers 53 (or variable attenuators) to give a different group delay and a different gain to the received signal according to passband (which sometimes will be referred to hereinafter as "divided band") of the BPF 51, thereby adjusting the frequency characteristic (compensation characteristic) thereof properly.

The preamplifier 3 and the equalization amplifier 5, capable of individually controlling the frequency characteristics according to passband of the received signal is obtainable in this way, so high-accuracy two-stage waveform degradation compensation is realizable by the preamplifier 3 and the equalization amplifier 5, which contributes greatly to the realization of this optical receiving apparatus 1. Incidentally, it is also possible that, in order to make the aforesaid band division with high accuracy, a digital filter, designed to perform the filtering through logic, is used for the BPF 51.

Figure 20:
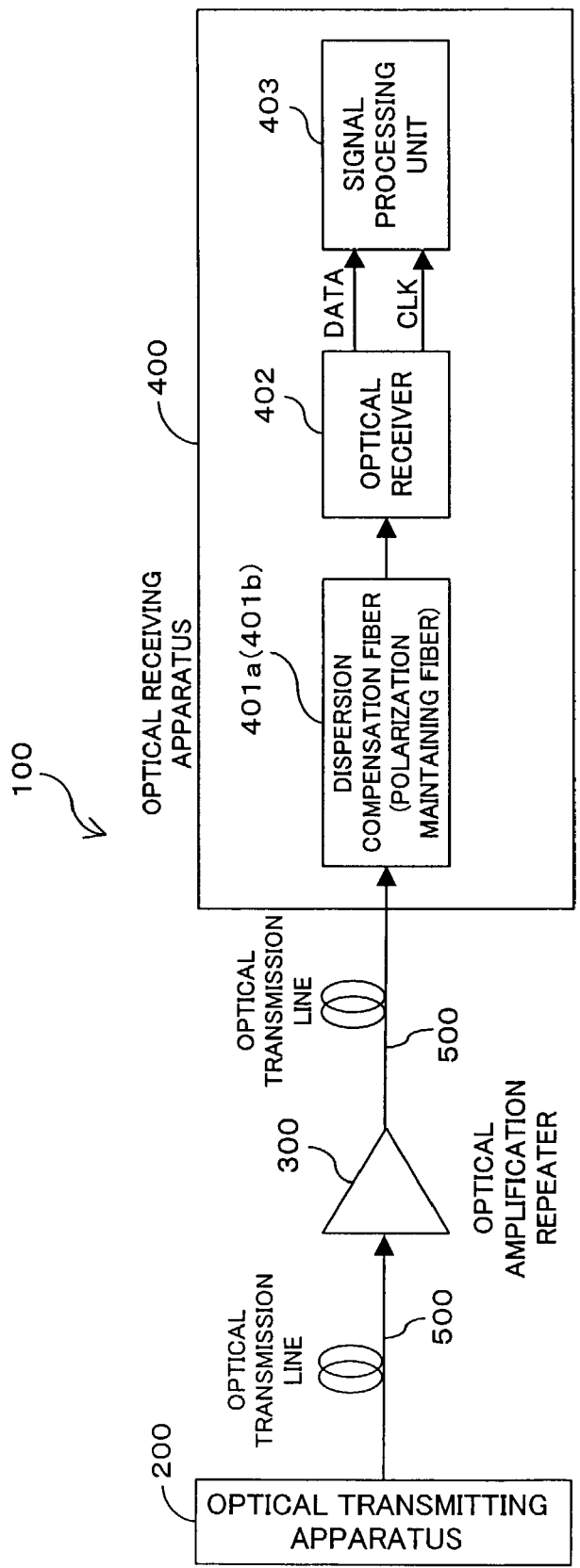
FIG. 20 is a block diagram showing one example of the existing optical transmission systems.

The clock extractor 6 is for regenerating a clock (CLK) from the aforesaid received signal, with the clock regenerated being supplied to the received waveform measuring circuit 8 (divider 11, which will be described later with reference to FIG. 2), the identification unit 7 and a signal processing unit (for example, see reference numeral 403 in FIG. 20) for conducting digital signal processing. In addition, the identification unit 7 is for identifying and regenerating the output of the equalization amplifier 5 in accordance with the clock regenerated by the clock extractor 6 to output signal data to the signal processing unit, and the received waveform measuring circuit (received waveform measuring means; received signal waveform measuring unit) 8 monitors the output waveform of the equalization amplifier 5, that is, a waveform (eye pattern) of the received signal, to measure waveform data thereof (which will equally be referred to hereinafter as "received waveform data").

Moreover, the control circuit 9 is for controlling the frequency characteristics of the preamplifier 3 and the equalization amplifier 5 to minimize the difference between frequency data on the received signal obtained by converting the eye pattern data on the received signal undergoing waveform degradation in the optical transmission line 30, measured by the received waveform measuring circuit 8 (which will hereinafter be referred to equally as a "monitor circuit 8"), into a frequency domain through the use of FFT (Fast Fourier Transform) and frequency data on a reference waveform free from waveform degradation.

For compensating simultaneously for waveform degradation stemming from the polarization mode dispersion generally requiring fast compensation (for example, order of 1 ms) and originating from the chromatic dispersion which generally allows slow compensation (for example, order of 1 μs) as compared therewith, there is a need for (1) the enlargement of the dynamic range with respect to waveform degradation (or the enlargement of the compensation range for waveform degradation), (2) the improvement of control capability, and (3) the stability of the compensation control system.

In particular, in the case of the very-high-rate optical transmission represented by 10 Gb/s or 40 Gb/s, in one feedback control for the waveform compensation, difficulty is experienced in realizing the above-mentioned (1), and because of the requirement for carrying out the fast compensation and the slow compensation simultaneously, a problem occurs on stability of the feedback control system. The improvement of the control capability for avoiding these problems leads to an increase in circuit scale or a lengthening in processing time, thereby making it difficult to conduct the polarization mode dispersion compensation (for example, order of 1 ms) forming the fast compensation.

For this reason, in this embodiment, for example, as shown in FIG. 1, the aforesaid time-constant generating circuit 16-1, having a time constant $\tau 1$, is placed between the control circuit 9 and the preamplifier 3, and the aforesaid time-constant generating circuit 16-2, having a time constant $\tau 2$ ($\neq \tau 1$), is located between the control circuit 9 and the equalization amplifier 5, thereby making a time difference in compensation speed (control speed) between the polarization mode dispersion compensation, generally requiring fast compensation because the polarization state of light in an optical fiber varies at random, and the chromatic dispersion compensation, generally allowing slow compensation as compared therewith. That is, the aforesaid time-constant generating circuits 16-1 and 16-2 function as time-constant generating means to make a difference between the speeds of the frequency characteristic control on the preamplifier 3 and the equalization amplifier 5 in the control circuit 9.

In this way, a time difference is made between the speed of the compensation based on the feedback control from the control circuit 9 to the preamplifier 3 and the speed of the compensation based on the feedback control from the control circuit 9 to the equalization amplifier 5. This can not only achieve the stable compensation control to compensate for the waveform degradation containing any speed variation but also reduce the frequency data difference calculation processing in the control circuit 9.

Figure 5:
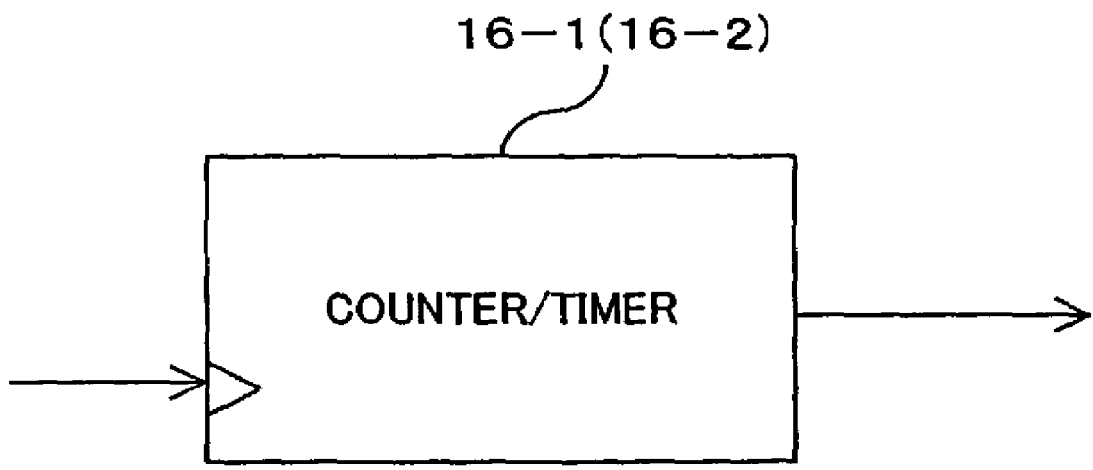
FIG. 5 is a block diagram showing a configuration of a time-constant generating circuit shown in FIG. 1.

In this connection, for carrying out the fast compensation (polarization mode dispersion compensation) in the preamplifier 3 and the slow compensation (chromatic dispersion compensation) in the equalization amplifier 5, the time constants $\tau 1$ and $\tau 2$ of the time-constant generating circuits 16-1 and 16-2 are designed to have the relationship of $\tau 1 \ll \tau 2$. Moreover, for example, as shown in FIG. 5, these time-constant generating circuits 16-1 and 16-2 can be constructed through the use of a digital circuit such as a counter or a timer which receives, as an input signal, a reference clock signal from the CLK extractor 6, or with an analog circuit using resistor and capacitor. In either case, it is realizable with a simple configuration.

Secondly, a detailed description will be given hereinbelow of the aforesaid monitor circuit 8 and the aforesaid control circuit 9.

Figure 2:
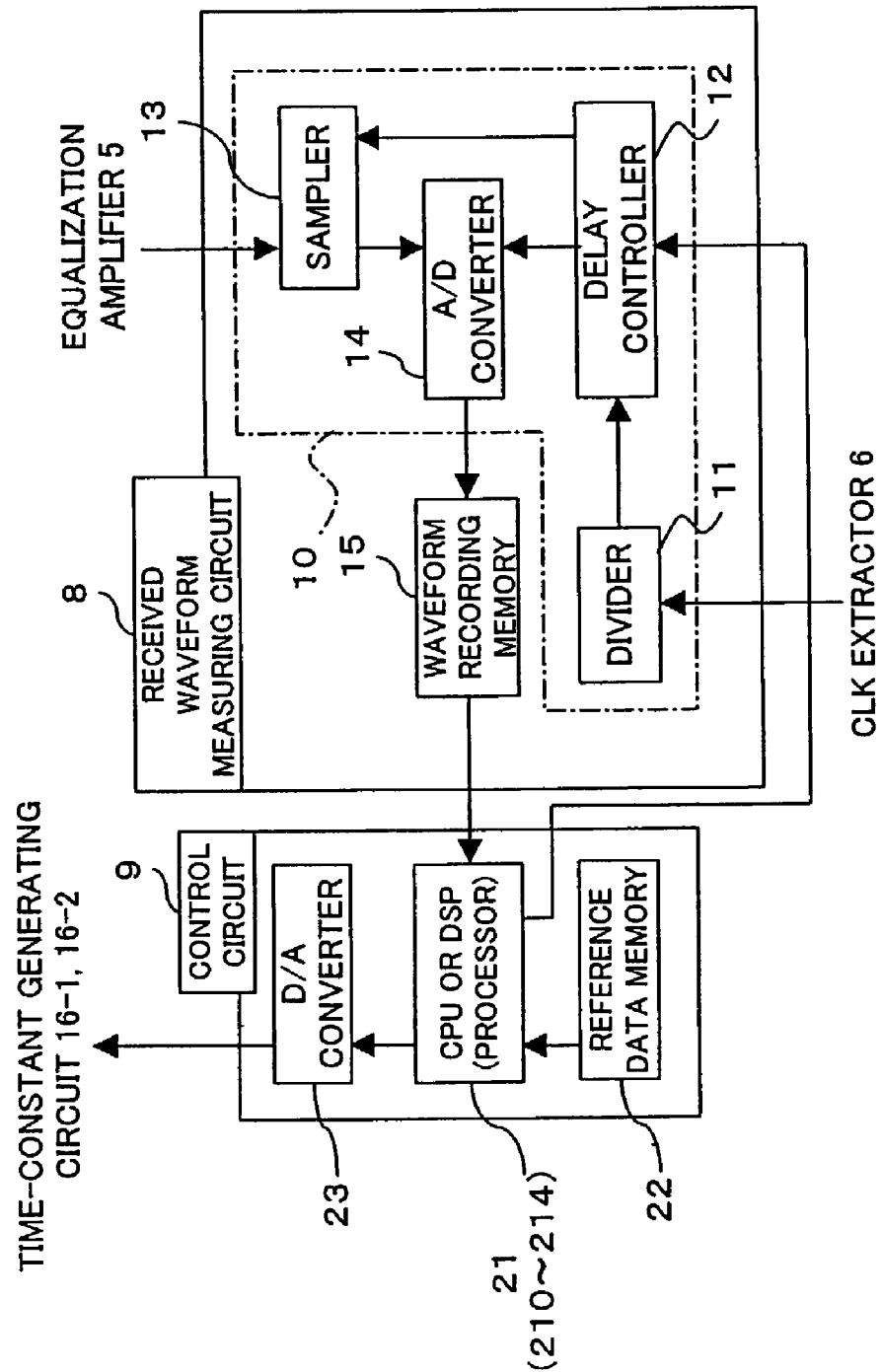
FIG. 2 is a block diagram showing configurations of a received waveform measuring circuit and a control circuit shown in FIG. 1.

As FIG. 2 shows, the monitor circuit 8 has a divider 11, a delay controller 12, a sampler 13, an analog/digital (A/D) converter 14 and a waveform recording memory 15, while the control circuit 9 has a processor 21 comprising a CPU (Central Processing Unit), DSP (Digital Signal Processor) or the like, a reference data memory 22 and a digital/analog (D/A) converter 23.

In the monitor circuit 8, the divider 11 divides down a high-speed (reference) clock (for example, 10 GHz or 40 GHz) synchronized with the received signal, regenerated by the clock extractor 6 to generate a clock suitable as an operational clock for the monitor circuit 8 (clock for facilitating equivalent-time sampling which will be described later), and the delay controller 12 controls the delay time of the reference clock divided down in the divider 11 to supply the output of the divider 11 as a trigger output (sampling timing) to the sampler 13 while delaying periodically. At this time, the delay time (delay value) is outputted to the A/D converter 14.

The sampler (sampling circuit) 13 samples the output of the equalization amplifier 5 at a trigger (sampling) timing from the delay controller 12 to acquire wave-height (amplitude) data, while the A/D converter 14 A/D-converts the wave-height data acquired through the sampling in the sampler 13 and the delay value from the delay controller 14.

In addition, the waveform recording memory (waveform data recording unit) 15 stores a set of the wave-height data and delay value A/D-converted in the A/D converter 14 to record the wave-height data corresponding to each delay time as waveform data on the received signal to be converted (FFT) into a frequency domain for the calculation of a difference with respect to the frequency data on a reference waveform which will be described later. For example, this waveform recording memory 15 is realizable with a RAM or the like.

Figure 6:
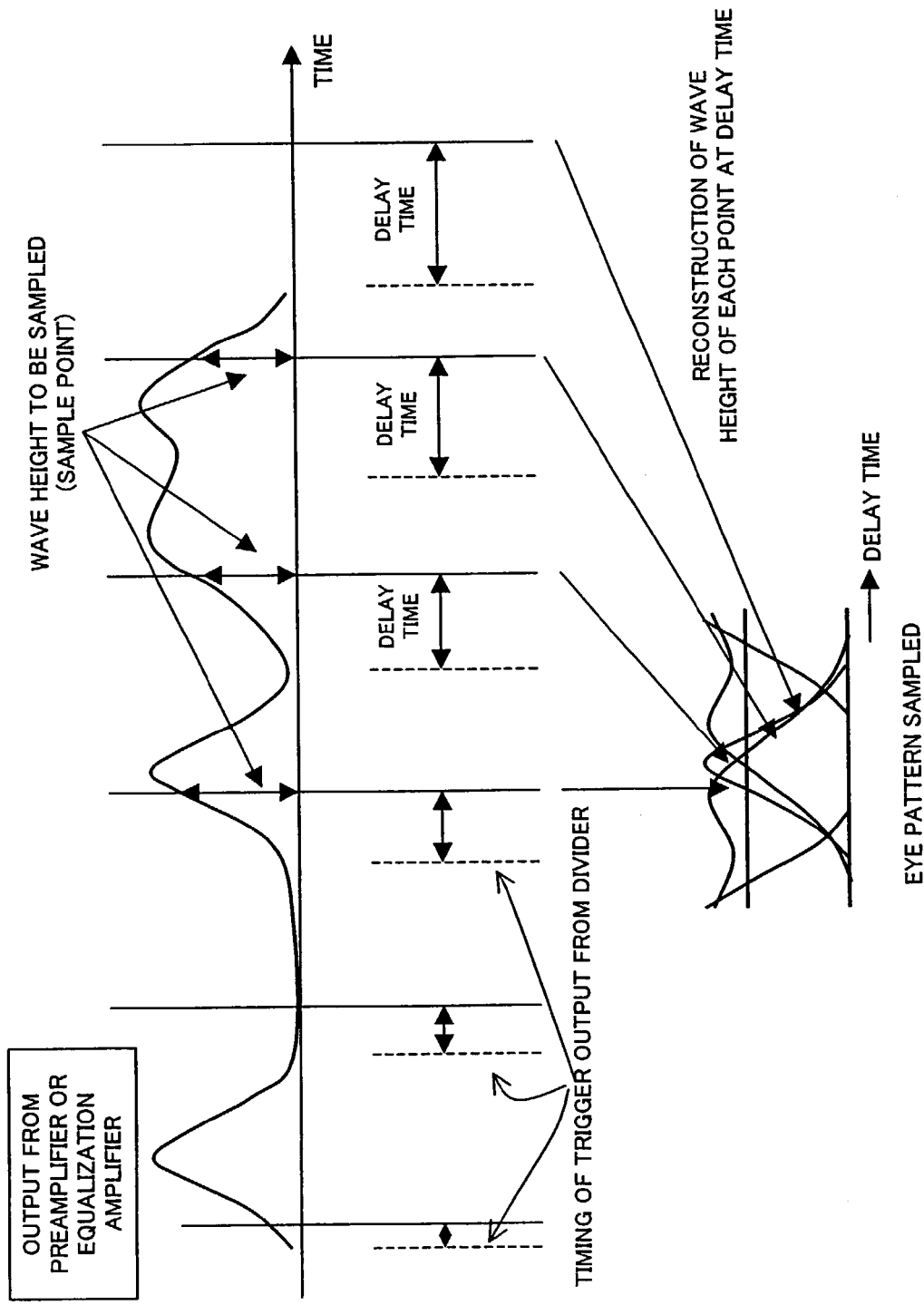
FIG. 6 is an illustrative view for explaining an equivalent-time sampling in the received waveform measuring circuit shown in FIG. 1.

In this configuration, in this embodiment, the delay controller 12 increases the aforesaid delay time consecutively (periodically) to shift (delay) the sampling timing consecutively, for example, as shown illustratively in FIG. 6 so that wave-height data is recorded in the waveform recording memory 15 at each timing. The recorded wave-height data corresponding to each delay time is reconstructed at a period according to a bit rate of the received signal, thereby providing a waveform (eye pattern) of the received signal.

That is, a section comprising the divider 11, the delay controller 12, the sampler 13 and the A/D converter 14 functions as an equivalent-time sampling unit 10 for equivalent-time-sampling a received signal to acquire a plurality of wave-height data on the received signal, and a section comprising the divider 11 and the delay controller 12 functions as a sampling timing generating circuit for generating a sampling time on the basis of a reference clock synchronized with the received signal to shift the output timing periodically and output it.

Furthermore, in the control circuit 9, the reference data memory 22 is for previously storing reference data (frequency data on a reference waveform which is not subjected to waveform degradation) to be referred to (to be compared) in obtaining a difference in frequency characteristic in the processor 21. The processor 21 has functions to, as mentioned above, reconstructs the wave-height data recorded in the waveform recording memory 15 according to the delay time for regenerating the eye pattern of the received signal and further to calculate, on the basis of the frequency data on the received signal obtained by the FFT of that eye pattern and the reference data in the reference data memory 22, a difference between the frequency data [difference in amplitude component and difference in group delay (phase) component] for controlling the frequency characteristics (the group delay quantity of the phase shifter 52, the gain of the amplifier 53) of the preamplifier 3 and the equalization amplifier 5 so that the difference therebetween reaches a minimum.

That is, this processor 21 additionally has the following features:

(1) a function as an FFT unit (Fourier-transform unit) 211 for obtaining frequency data on received waveform data by means of FFT of the received waveform data acquired by the monitor circuit 8;

(2) a function as a difference calculating unit 212 for calculating a difference between the aforesaid frequency characteristics (amplitude component and group delay component) on the basis of the frequency data obtained by the FFT unit 211 and the frequency data on a reference waveform free from waveform degradation;

(3) a function as a compensation characteristic determining unit 213 for obtaining frequency characteristics (compensation characteristics) of the preamplifier 3 and the equalization amplifier 5 so that each of the differences in the amplitude component and in the group delay component, obtained by the difference calculating unit 212, shows a minimum; and (4) a function as a control signal generating unit 214 for generating a control signal to control the preamplifier 3 and the equalization amplifier 5 so that they have the frequency characteristics obtained by the compensation characteristic determining unit 213.

The FFT unit 211 and the difference calculating unit 212 function as a calculating means 210 to perform the FFT and the difference calculation. In addition, the calculating means 210 and the monitor circuit 8 realizes a function as a received signal waveform degradation detecting unit (received waveform degradation detecting means) for detecting waveform degradation (difference between received waveform data and reference waveform data) of the received signal.

Furthermore, the D/A converter 23 is for converting a control signal (analog signal) for controlling the frequency characteristics of the preamplifier 3 and the equalization amplifier 5, produced in the processor 21 (control signal generating unit 214), into a digital signal which in turn, is supplied through the time-constant generating circuits 16-1 and 16-2 to the preamplifier 3 and the equalization amplifier 5.

Figure 7:
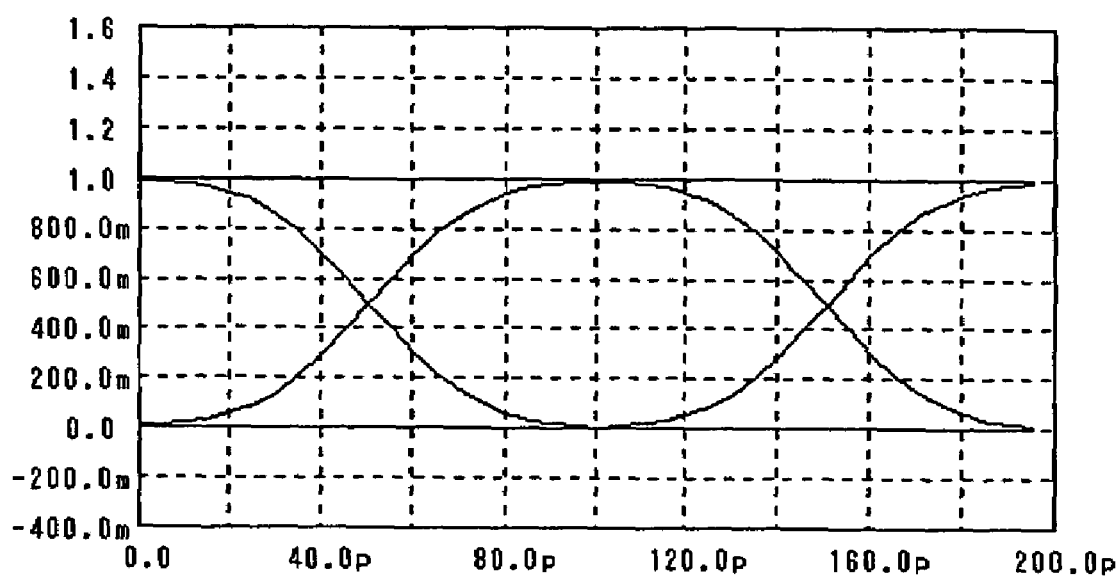
FIG. 7 is an illustration of one example of a reference waveform to be used in the optical receiving apparatus shown in FIG. 1.

In this embodiment, for example, when a received signal is a 10-Gb/s NRZ (Non Return to Zero) signal, as the aforesaid "reference waveform", it is possible to use a waveform, shown in FIG. 7, to be obtained by passing a square wave with 10 Gb/s and with DUTY:100% through a fourth-order Bessel-Tomson filter with a cutoff frequency of 7 GHz.

In addition, it is acceptable that either the frequency data before the FFT or the frequency data after the FFT is stored as the "reference data" in the aforesaid reference data memory 22. However, in the case of the storage of the frequency data before the FFT, for the coincidence of the data dimension, the "reference data" is also required to undergo the FFT before the aforesaid difference calculation.

A detailed description will be given hereinbelow of a basic operation of the optical receiving apparatus 1 thus constructed according to this embodiment.

First, an optical signal transmitted through the optical transmission line 30 is converted into a current signal by the light-receiving device 2 and current/voltage-converted by the preamplifier 3, and then inputted to the equalization amplifier 5. The equalization amplifier 5 amplifies the received signal (electric signal) and then outputs it to the clock extractor 6, the identification unit 7 and the monitor circuit 8. The clock extractor 6 regenerates, from the received signal inputted from the equalization amplifier 5, a reference clock synchronized with the received waveform thereof.

The reference clock regenerated is fed to the identification unit 7, the monitor circuit 8 (divider 11) and the signal processing unit (not shown). The identification unit 7 identifies and regenerates the output of the equalization amplifier 5 on the basis of the reference clock fed from the clock extractor 6 in this way, then outputting it to the aforesaid signal processing unit.

Figure 8:
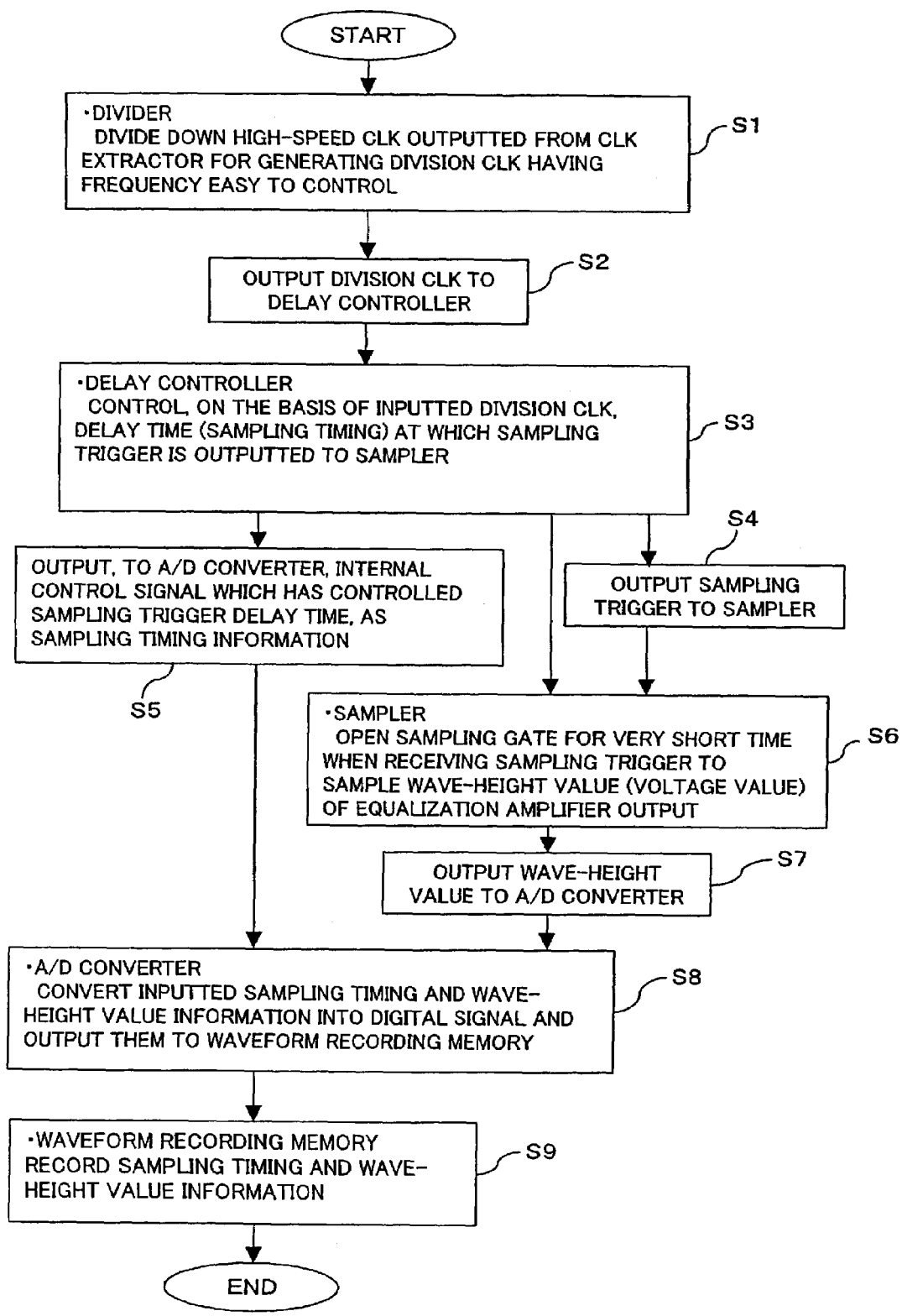
FIG. 8 is a flow chart for explaining an operation of the optical receiving apparatus (received waveform measuring circuit) shown in FIG. 1.

On the other hand, at this time, as FIG. 8 shows, in the monitor circuit 8, the reference clock from the clock extractor 6 is divided down by the divider 11 (dividing process), thereby generating an operational clock (which will equally be referred to hereinafter as a "division clock") producing a frequency which facilitates easy equivalent time sampling control (step S1; sampling timing generating process).

This division clock is inputted to the delay controller 12 (step S2), and the delay controller 12 changes the output timing of the division clock (delays by very short time) [step S3; sampling timing shift (delay control) process], and supplies it as a trigger output (sampling timing; which will equally be referred to hereinafter as "sampling trigger") to the sampler 13 (step S4), and outputs the delay value at that time as sampling timing information (an internal control signal which has controlled the delay time of the sampling trigger) to the A/D converter 14 (step S5).

The sampler 13 opens a sampling gate (not shown), that is, conducts the output (which sometimes will be referred to hereinafter as an "equalization amplification output") of the equalization amplifier 5, for only a very short time in response to each sampling trigger from the delay controller 12 to sample the wave-height data (sampling point; voltage value) on the equalization amplification output [step S6; (equivalent-time) sampling process] and output the wave-height data to the A/D converter 14 (step S7).

Figure 10:
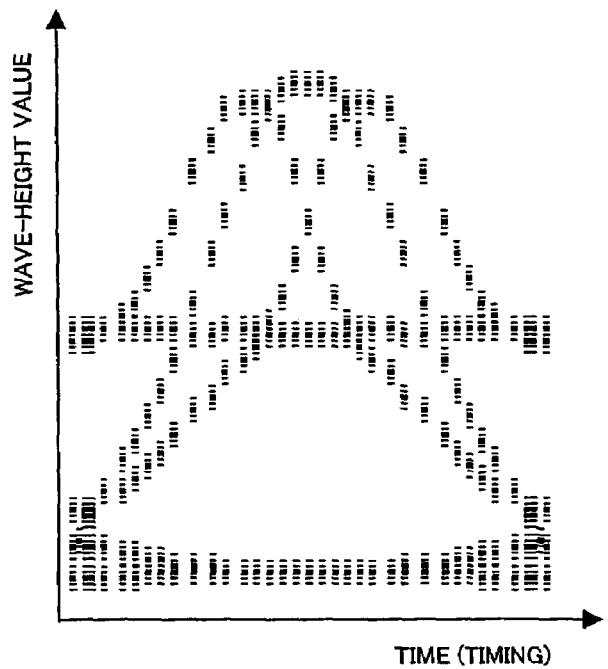
FIG. 10 is an illustrative view showing one example of wave-height data to be recorded in a waveform recording memory shown in FIG. 2.

The A/D converter 14 converts the aforesaid delay value (sampling timing information) inputted from the delay controller 12 and the wave-height data inputted from the sampler 13 into digital signals and records them in the waveform recording memory 15 (steps S8 and S9); waveform data recording process (the above description relates to a received waveform measuring process). Thus, an eye pattern of the received signal corresponding to the delay time is recorded in the waveform recording memory 15 (see FIG. 10).

Figure 9:
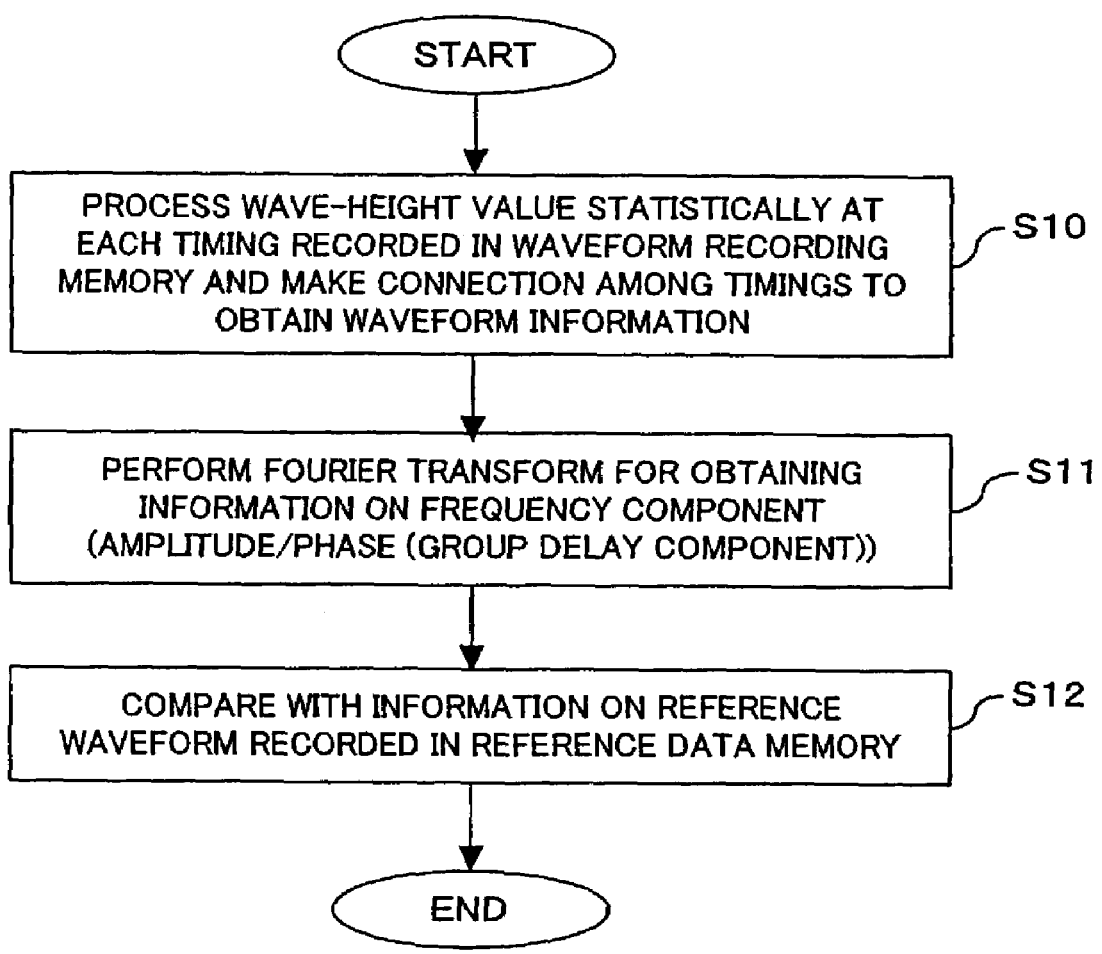
FIG. 9 is a flow chart for explaining an operation [statistics (waveform regeneration)/comparison processing] of the optical receiving apparatus (control circuit) shown in FIG. 1.
Figure 11:
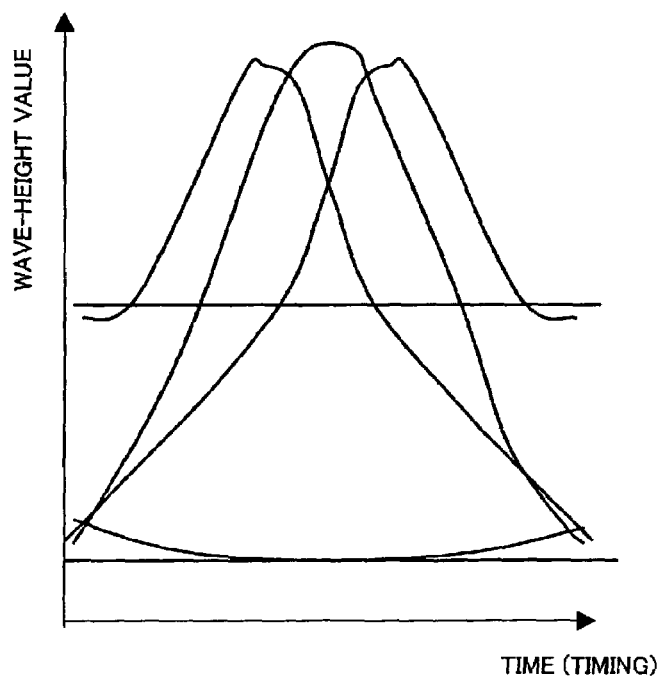
FIG. 11 is an illustrative view showing one example of a received waveform regenerated from wave-height data, shown in FIG. 10, through statistics processing.

Secondly, in the control circuit 9, as FIG. 9 shows, the processor 21 statistically processes the wave-height data at each sampling timing (delay time) recorded in the waveform recording memory 15 to acquire (reconstruct) received waveform data by connecting the wave-height data at the respective timings (see FIG. 11; step S10). In addition, the processor 21 (FFT unit 211) obtains the frequency data [(amplitude) component and group delay (phase) component] of the received waveform by performing the FFT of the acquired received waveform data (step S11).

Figure 12C:
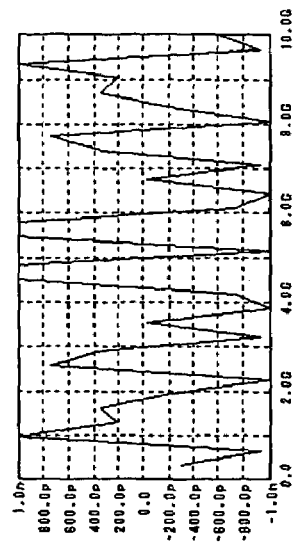
FIG. 12C is an illustration of group delay (phase) component of the reference waveform shown in FIG. 12A.
Figure 12F:
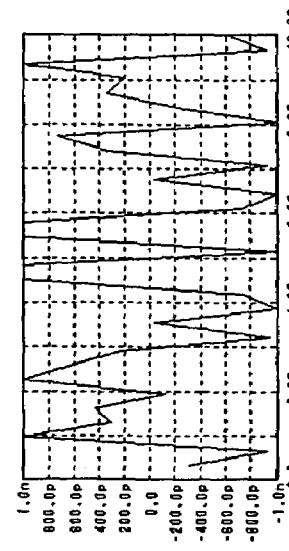
FIG. 12F is an illustration of a group delay (phase) component of the received waveform shown in FIG. 12D.
Figure 12B:
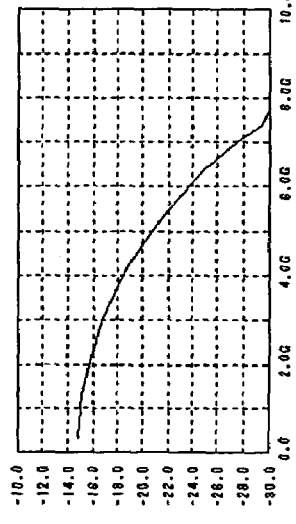
FIG. 12B is an illustration of a frequency (amplitude) component of the reference waveform shown in FIG. 12A.
Figure 12E:
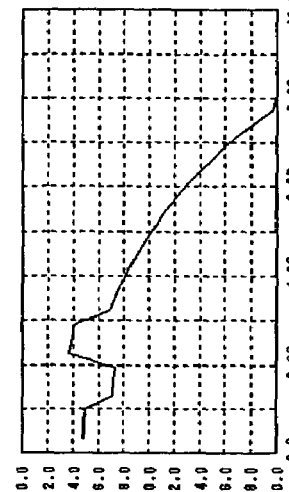
FIG. 12E is an illustration of a frequency (amplitude) component of the received waveform shown in FIG. 12D.
Figure 12A:
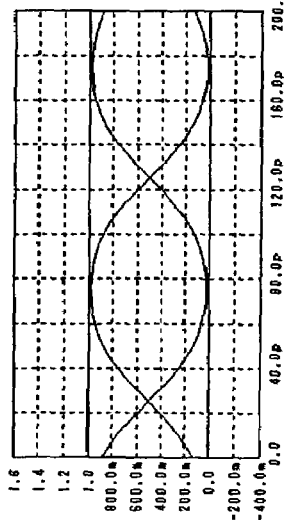
FIG. 12A is an illustration of a reference waveform.
Figure 12D:
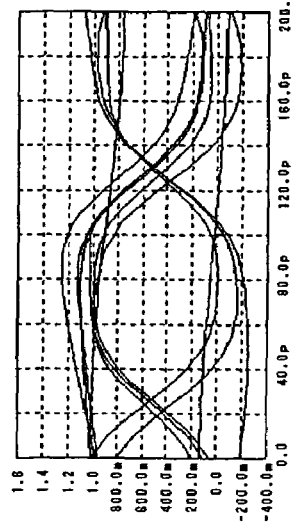
FIG. 12D is an illustration of a received waveform subjected to waveform degradation.

For example, assuming that the received waveform reconstructed as mentioned above shows a waveform shown in FIG. 12D, when the waveform shown in FIG. 12D is FFT-processed in the processor 21, an amplitude component shown in FIG. 12E and a group delay component shown in FIG. 12F are obtainable [in other words, the waveform shown in FIG. 12D has the amplitude component shown in FIG. 12E and the group delay component shown in FIG. 12F].

Furthermore, the processor 21 (difference calculating unit 212) makes a comparison between the amplitude component and group delay component of the received waveform thus obtained and an amplitude component (see FIG. 12B) and group delay component (see FIG. 12C) of a reference waveform (see FIG. 12A) previously stored in the reference data memory 22 for each divided band stated above, thus calculating a difference between the amplitude components and a difference between the group delay components according to divided band (step S12; difference calculating process). This calculation of each difference corresponds to the detection of a degradation degree of the eye aperture of the received signal.

Figure 13A:
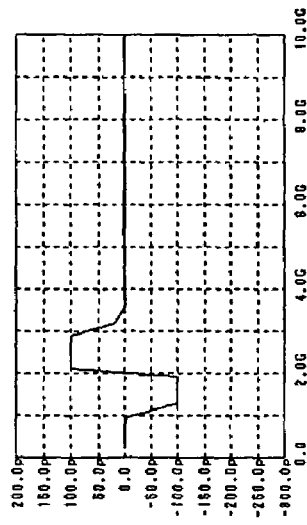
FIG. 13A is an illustration of a correction characteristic of a frequency (amplitude) component of a received waveform to be obtained by the comparison between the waveforms shown in FIGS. 12B and 12E.
Figure 13B:
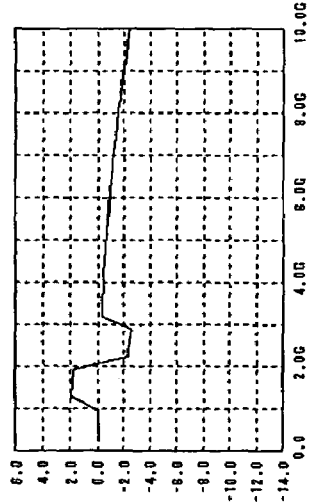
FIG. 13B is an illustration of a correction characteristic of a group delay (phase) component of the received waveform to be obtained by the comparison between the waveforms shown in FIGS. 12C and 12F.

Still furthermore, the processor 21 obtains correction characteristics (for example, see FIGS. 13A and 13B) on the amplitude component and the group delay component to minimize the differences in amplitude component and in group delay component, calculated according to divided band as mentioned above (compensation characteristic determining process), and generates a control signal (digital signal) for controlling the frequency characteristic of the preamplifier 3 and the frequency characteristic of the equalization amplifier 5, i.e., the group delay quantities of the phase shifters 32 and 52 and the gain of the amplifier 53, individually (control signal generating process).

Figure 13D:
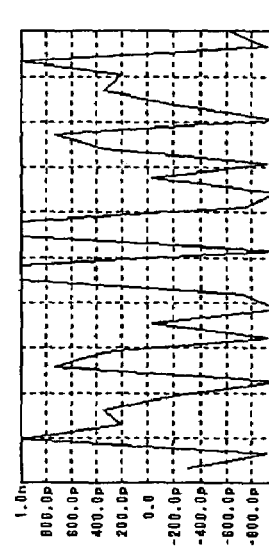
FIG. 13D is an illustration of a frequency (amplitude) component of the received waveform shown in FIG. 13C.
Figure 13E:
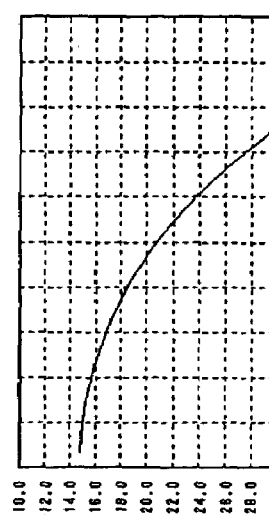
FIG. 13E is an illustration of a group delay (phase) component of the received waveform shown in FIG. 13C.
Figure 13C:
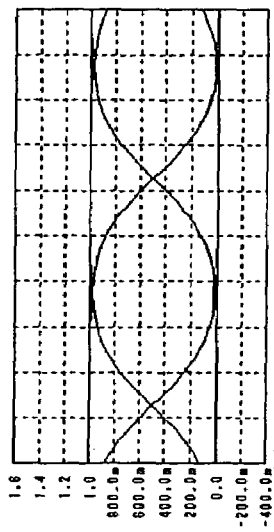
FIG. 13C is an illustration of the received waveform after the compensation based on the correction characteristics shown in FIGS. 13A and 13B.

Moreover, the control signal generated as mentioned above is converted into an analog signal by the D/A converter 23 and inputted to the time-constant generating circuits 16-1 and 16-2 to be subjected to the control speed delays corresponding to the time constants τ1 and τ2, and then inputted to the corresponding (control-needed) phase shifters 32, 52 and/or amplifier 53 of the preamplifier 3 and the equalization amplifier 5, thereby controlling the frequency characteristics of the preamplifier 3 and the equalization amplifier 5 for compensating for the waveform degradation of the received signal stemming from the optical transmission line 30 at two stages of the preamplifier 3 and the equalization amplifier 5, for example, as shown in FIGS. 13C to 13E (enlarging the eye aperture of the received signal; control process).

FIG. 13C shows a received waveform after the compensation for waveform degradation, FIG. 13D shows an amplitude component of the waveform degradation compensated received waveform shown in FIG. 13C, and FIG. 13E illustrates a group delay component of the same waveform degradation compensated received waveform shown in FIG. 13C.

As described above, in the receiving apparatus 1 according to this embodiment, it is possible to compensate for (enlarge) the waveform degradation (eye aperture) of a received signal at a plurality of stages by detecting the waveform degradation degree (eye aperture) of the received signal and controlling the frequency characteristics of the preamplifier 3 and the equalization amplifier 5, which enlarges the waveform degradation compensable range or the allowable waveform degradation range in the optical receiver 4 (that is, improving the reception sensitivity characteristic to lengthen the acceptable optical transmission distance).

Accordingly, it is possible to realize the high-accuracy compensation for the waveform degradation stemming from the chromatic dispersion, the polarization mode dispersion or the like without employing a dispersion compensation fiber or polarization maintaining fiber. In consequence, it is possible to improve the extensibility (applicability) and flexibility of the optical transmission system including cost.

In particular, according to this embodiment, the time-constant generating circuits 16-1 and 16-2 make a time difference between a speed of the compensation (polarization mode dispersion compensation) based on the feedback control from the control circuit 9 to the preamplifier 3 and a speed of the compensation chromatic dispersion compensation) based on the feedback control from the control circuit 9 to the equalization amplifier 5, thereby achieving the stable compensation control. This can make the compensation for the waveform degradation having any speed variation and lessen the frequency data difference calculation processing to be conducted in the control circuit 9 (processor 21). Incidentally, the aforesaid compensation speed difference can also be made through the use of only one of the time-constant generating circuits 16-1 and 16-2.

Still additionally, since the above-described optical receiving apparatus 1 can detect and compensate for the actual waveform degradation degree of a received signal in real time, in the case of very-high-rate optical transmission exceeding 10 Gb/s, even if the waveform degradation stemming from the polarization mode dispersion or chromatic dispersion, a received signal suffers, varies due to variations of the polarization mode dispersion characteristic or chromatic dispersion characteristic of the optical transmission line 30 originating from minute external factors such as temperature variations, the apparatus 1 is followable to the variations.

Moreover, since the processor 21 can univocally determine the optimum frequency characteristics of the preamplifier 3 and the equalization amplifier 5 which minimizes the differences in frequency characteristic (amplitude and group delay), for example, as compared with a case in which a bit error rate (BER) or the like of a received signal is monitored to monitor the quality of the received signal so that compensation control is executed to bring the quality thereof to a predetermined degree, there is no need to conduct a sweeping operation for obtaining the optimum frequency characteristics of the preamplifier 3 and the equalization amplifier 5, and for this reason, fast and certain compensation control becomes feasible.

Still moreover, the monitor circuit 8 acquires a plurality of wave-height data through equivalent-time sampling (a reference clock synchronized with a received signal is divided down in the divider 11 and the divided clock is fed as a sampling timing to the sampler 13 while being shifted (delayed) periodically in the delay controller 12) of a received signal (equalization amplification output) and records the acquired 1 wave-height data as received waveform data (eye pattern of the received signal) in the waveform recording memory 15; therefore, irrespective of the reference clock rate (frequency), it is possible to generate a sampling timing on the basis of an appropriate operational clock in the apparatus at all times.

Accordingly, it is possible to ensure certain recording/ measurement of received waveform data even in a case in which the received signal is a very-high-rate signal exceeding 10 Gb/s or 40 Gb/s, so satisfactory compensation control is executable also for high-rate signals.

In particular, since the divider 11 and the delay controller 12 are used as mentioned above, although a divider capable of dividing down into integer (N) times is put to use, it is possible to output a sampling timing at an arbitrary timing owing to the delay control in the delay controller 12; whereupon, an equivalent-time sampling unit 10 having an extremely high flexibility is realizable with a simple arrangement.

In this connection, although the above-mentioned equivalent-time sampling unit 10 generates sampling timing on the basis of the reference clock synchronized with a received signal, it is also appropriate that this sampling timing is time-weighted according to a degree of waveform degradation to make sampling timings irregularly (densely and sparsely).

Figure 14:
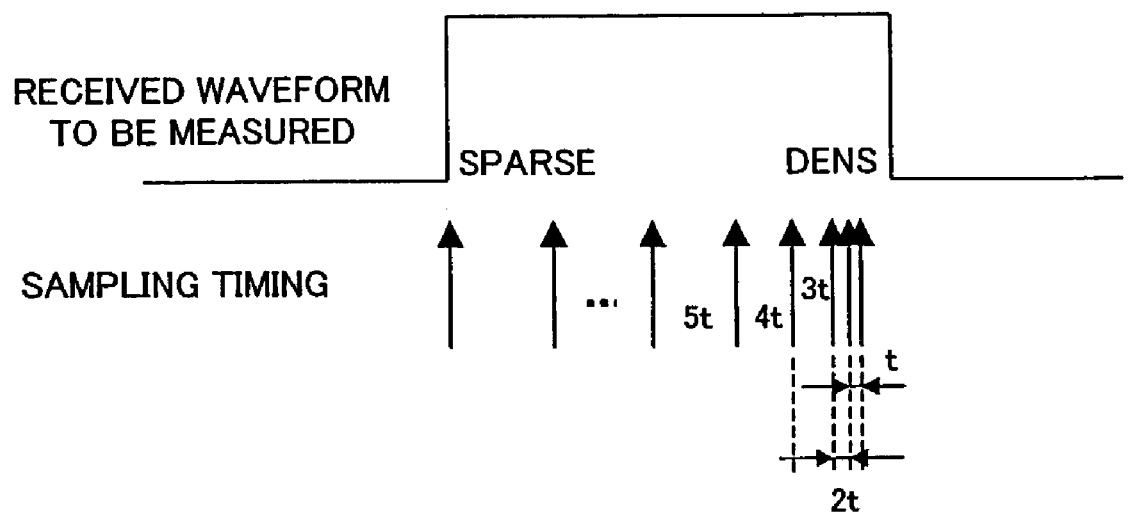
FIG. 14 is an illustrative view for explaining irregular equivalent-time sampling in the received waveform measuring circuit shown in FIG. 1.

For example, as illustratively shown in FIG. 14, with respect to received waveform data in which noticeable waveform degradation occurs in a first half place of one bit, sampling is made densely in this place while sampling is made sparsely in the remaining second half place of one bit. This can securely realize high-accuracy compensation, and because there is no need to increase the number of sampling timings as a whole, can reduce the necessary processing speed and memory area for the frequency data difference calculation processing in the control circuit 9.

The equivalent sampling made densely and sparsely is realizable in a manner that an n-bit counter and an n-bit shift register are used as the delay controller 12 and the density and sparsity of the sampling timings are changed in accordance with an instruction from the processor 21. That is, in this case, the delay controller 12 also functions as a time weighting unit for time-weighting sampling timings in the equivalent-time sampling unit 10.

(A1) Description of First Modification of Basic Mode

Figure 15:
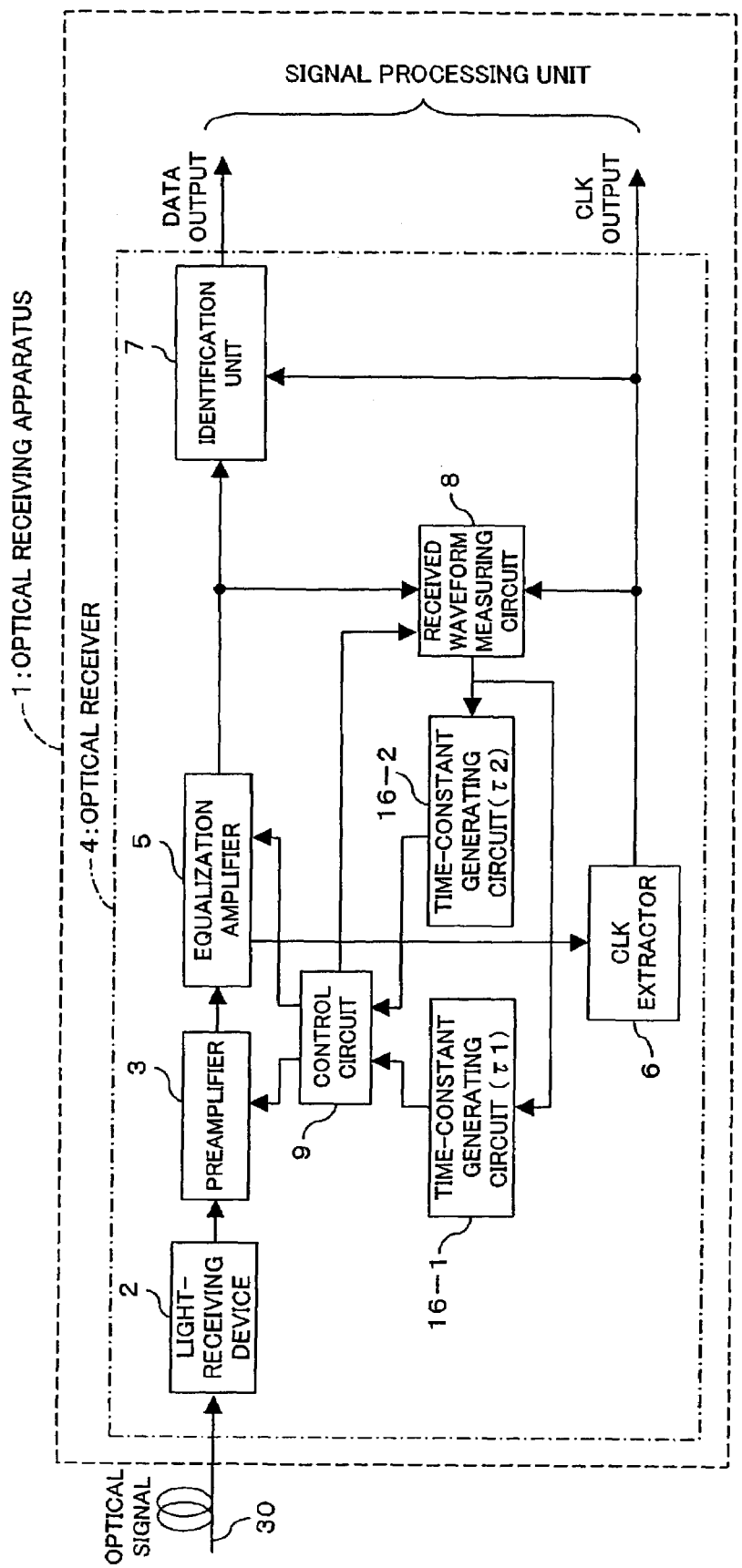
FIG. 15 is a block diagram showing a first modification of the optical receiving apparatus shown in FIG. 1.

FIG. 15 is a block diagram showing a first modification of the above-described optical receiving apparatus. The optical receiving apparatus 1 shown in FIG. 1 differs from the apparatus described above with reference to FIG. 1 in that the time-constant generating circuits 16-1 and 16-2 are provided between the monitor circuit 8 and the control circuit 9. The parts marked with the same reference numerals as those used above are the same as or similar to those described above, and the configurations and operations of the received waveform measuring circuit 8 and the control circuit 9 are also the same as or similar to those described above.

That is, in this case, the control circuit 9 receives the output signals of the time-constant generating circuits 16-1 and 16-2 and determines the frequency characteristics (compensation characteristics) of the preamplifier 3 and the equalization amplifier 5. In other words, in the above-described embodiment, the control speed difference based on the feedback control systems of the two systems is realized by changing the time constant of a control signal to be produced by the control circuit 9, while in this modification, the same control speed difference is realized by changing the compensation characteristic determination speed in the control circuit 9.

Accordingly, this configuration can also provide the effects similar to those of the embodiment described above. Also in this case, the compensation (control) speed difference can be realized through the use of only one of the time-constant generating circuits 16-1 and 16-2.

(A2) Description of Second Modification of the Basic Mode

Figure 16:
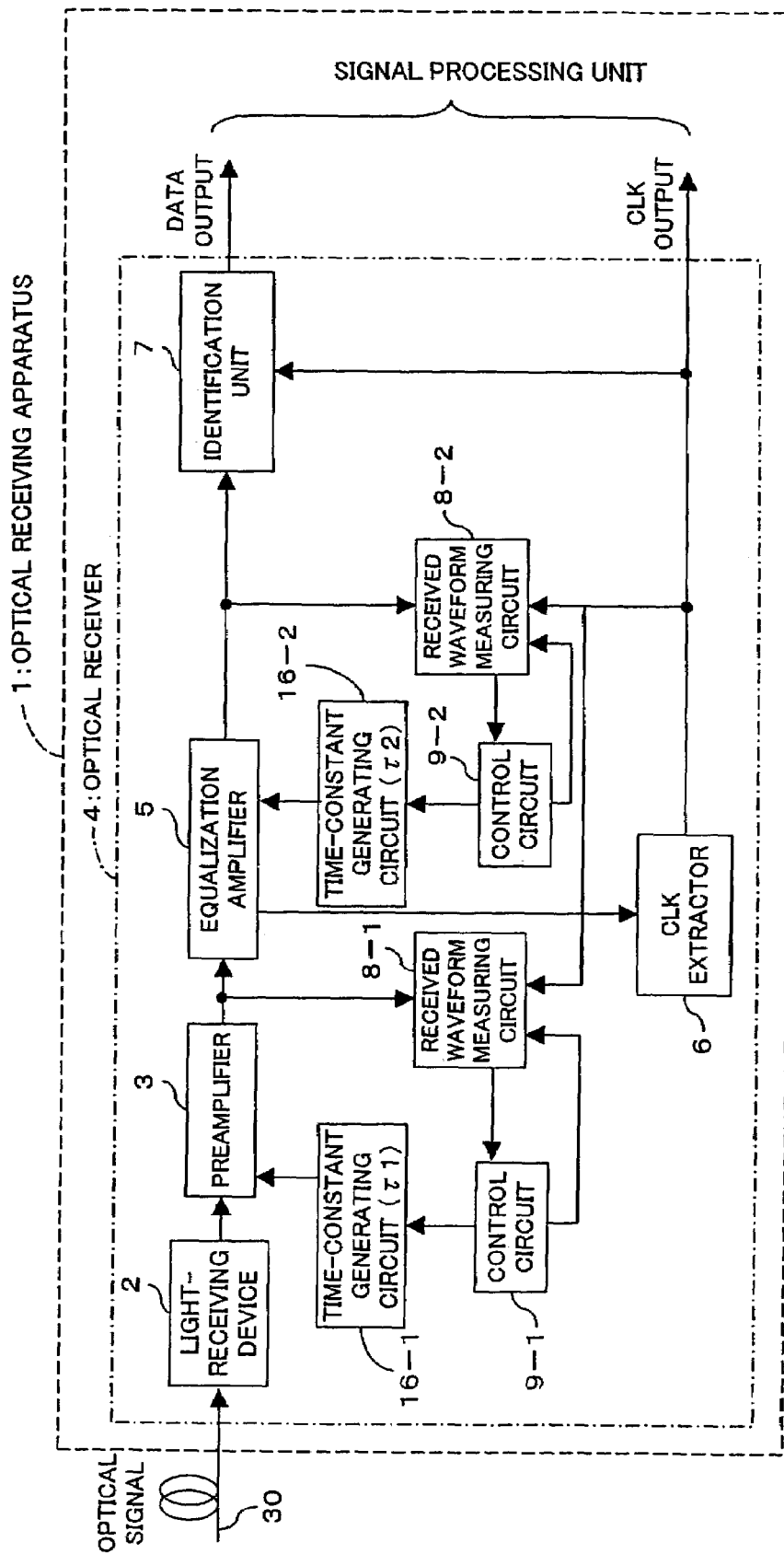
FIG. 16 is a block diagram showing a second modification of the optical receiving apparatus shown in FIG. 1.

FIG. 16 is a block diagram showing a second modification of the optical receiving apparatus described above with reference to FIG. 1. The optical receiving apparatus shown in FIG. 16 differs from the apparatus described above with reference to FIG. 1 in that received waveform measuring circuits 8-1, 8-2 and control circuits 9-1, 9-2 forming two-systems (first and second) are provided in conjunction with the preamplifier 3 and the equalization amplifier 5. That is, in this case, the feedback control system (polarization mode dispersion compensation control system) for the preamplifier 3 and the feedback control system (chromatic dispersion compensation control system) for the equalization amplifier 5 are provided in a physically independent condition.

Accordingly, in this case, one (first) received waveform measuring circuit 8-1 measures the received waveform data on an output of the preamplifier 3 while the other (second) received waveform measuring circuit 8-2 measures the received waveform data on an output of the equalization amplifier 5.

In addition, the (first) control circuit 9-1 determines a frequency characteristic of the preamplifier 3 on the basis of the measurement result in the received waveform measuring circuit 8-1 to produce a necessary control signal, while the (second) control circuit 9-2 determines a frequency characteristic of the equalization amplifier 5 on the basis of the measurement result in the received waveform measuring circuit 8-2 to produce a necessary control signal.

Incidentally, the arrangements and operations of these received waveform measuring circuits 8-1, 8-2 and the control circuits 9-1, 9-2 are the same as or similar to those of the above-mentioned received waveform measuring circuit and control circuit 9.

This configuration can also provide the advantages similar to those of the optical receiving apparatus 1 described above with reference to FIG. 1, and achieves further enlargement of the waveform degradation compensation range and further stability of the compensation control system.

Incidentally, also in this configuration, as well as the above-described first modification, the time-constant generating circuit 16-1 (16-2) can also be placed between the received waveform measuring circuit 8-1 (8-2) and the control circuit 9-1 (9-2). Moreover, the compensation (control) speed difference can also be realized through the use of only one of the time-constant generating circuits 16-1 and 16-2.

(A3) Description of Third Modification of the Basic Mode

Figure 17:
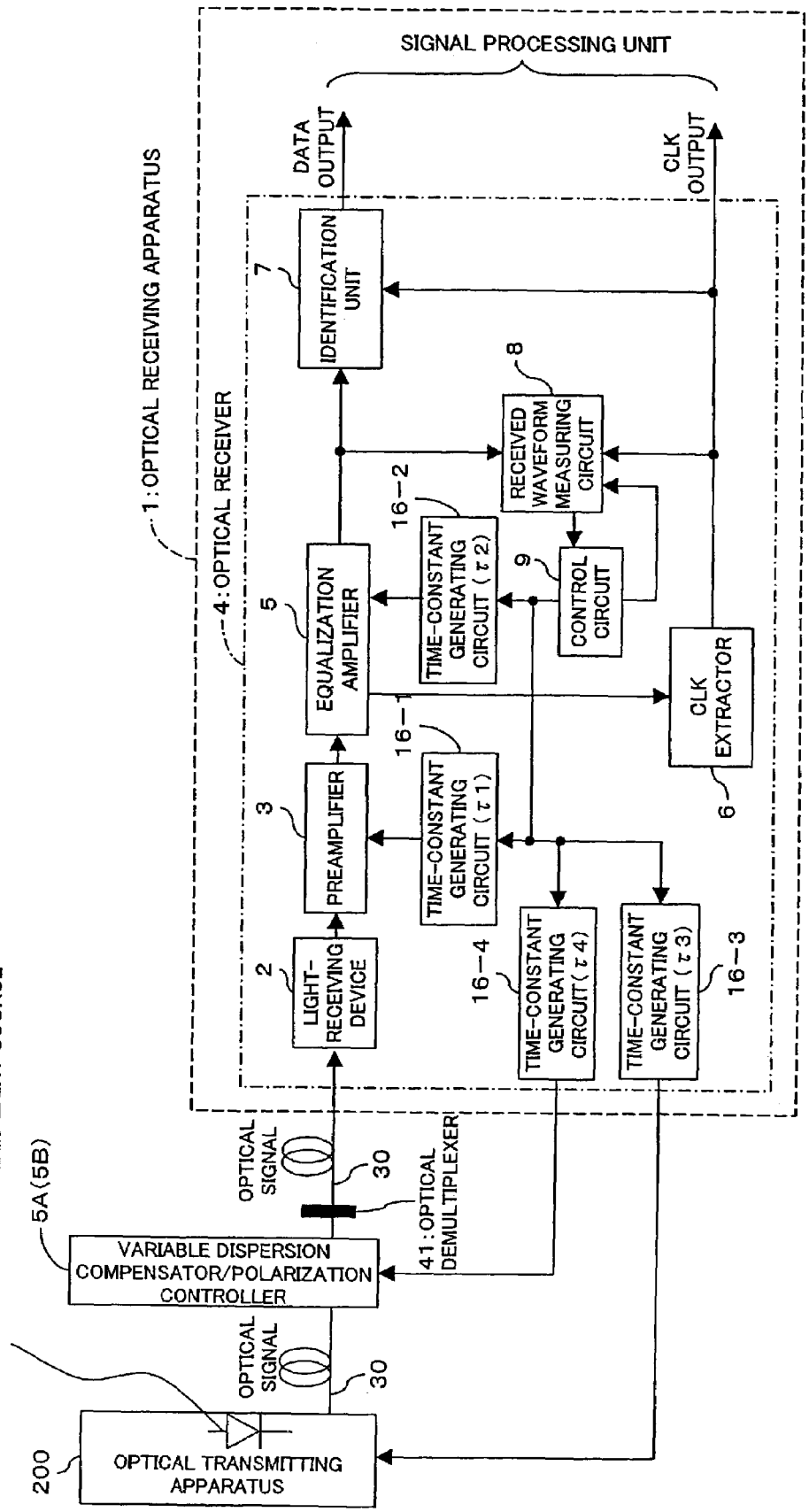
FIG. 17 is a block diagram showing a third modification of the optical receiving apparatus shown in FIG. 1.

FIG. 17 is a block diagram showing a third modification of the optical receiving apparatus 1 described above with reference to FIG. 1. The optical receiving apparatus 1 shown in FIG. 17 is designed to implement the feedback control with respect to an optical transmitting apparatus 200 (wavelength variable light source 201) and a variable dispersion compensator 5A (or polarization controller 5B). Also in FIG. 17, the same reference numerals as those used above designate the same or similar parts.

In this configuration, the aforesaid variable dispersion compensator (optical waveform degradation compensating means) 5A is for batch-controlling, through the use of its own variable dispersion compensation characteristic, the wavelength dispersions occurring in a received WDM signal in an optical signal state at the former stage of an optical demultiplexer (demultiplexing unit) 41, while the polarization controller 5B freely controls the polarization of a received WDM signal, and is designed to compensate for the waveform degradation stemming from the chromatic dispersion or polarization mode dispersion of the received WDM signal in a manner that the chromatic dispersion or polarization mode dispersion compensation characteristic is controlled on the basis of a control signal produced in the control circuit 9. In this configuration, the aforesaid optical demultiplexer 41 is for receiving a WDM signal, obtained by multiplexing a plurality of kinds of wavelengths, from the optical transmission line 30 to demultiplex the WDM signal according to wavelength.

That is, in this case, control is executed with respect to the preamplifier 3 and the equalization amplifier 5 so that the difference between the frequency data obtained by FFT-processing the received waveform data acquired by the received waveform measuring circuit 8 of the optical receiver 4 and the frequency data on the reference waveform free from waveform degradation reaches a minimum, and control is implemented through the control circuit 9 with respect to the variable dispersion compensator 5A (or the polarization controller 5B) and the wavelength variable light source 201 of the optical transmitting apparatus 200, thereby compensating generally for the waveform degradation a WDM signal suffers due to the optical transmission.

In this case, as the feedback control system, there are four systems: the systems for the preamplifier 3 and the equalization amplifier 5 in the optical receiver 4 and the systems for the optical transmitting apparatus 200 and the variable dispersion compensator 5A (or the polarization controller 5B) and, therefore, in the optical receiver 4, four time-constant generating circuits 16-1 (time constant $\tau 1$), 16-2 (time constant $\tau 2$), 16-3 (time constant $\tau 3$) and 16-4 (time constant $\tau 4$) (time-constant generating means) are provided in conjunction with these systems so that time differences take place in control speed among them. Incidentally, the time-constant generating circuits 16-3 and 16-4 have an arrangement similar to those of the time-constant generating circuits 16-1 and 16-2, and the time constants $\tau 1$, $\tau 2$, $\tau 3$ and $\tau 4$ are set such that each of the systems does not oscillate.

With the above-described configuration according to this modification, the optical transmitting apparatus 200 and the variable dispersion compensator 5B (or the polarization controller 5B) first conducts the compensation in an optical signal condition to accomplish the waveform degradation compensation to some extent, and the preamplifier 3 and the equalization amplifier 5 in the optical receiver 4 then achieves the compensation in an electric signal condition. Thus, it is possible to maintain a large eye aperture of an optical waveform inputted to the light-receiving device 2 while improving the stability of the compensation control systems, and to further enlarge the waveform degradation compensation range the optical receiver 4 permits. In consequence, the reception sensitivity characteristic (dynamic range for the waveform degradation) of the optical receiver 4 is further improvable.

Incidentally, the optical receiver 4 having the above-described configuration shown in FIG. 17 can be provided for, of the wavelengths (channels) after the wavelength demultiplexing in the optical demultiplexer 41, at least one representative channel, and with respect to the remaining channels, the configuration shown in FIG. 1, 15 or 16 is applicable. Moreover, the control on only one of the optical transmitting apparatus 200 and the variable dispersion compensator 5A (or the polarization controller 5B) is acceptable.

In addition, it is also appropriate that a variable dispersion compensator is provided according to channel at the latter stage of an optical demultiplexer 41 to be controlled through a control circuit 9 of each of optical receivers 4. Moreover, in a case in which the variable dispersion compensator is provided according to channel at the latter stage of the optical demultiplexer 41, a chromatic dispersion quantity of an optical signal in each of the channels is determined by type (SMF, DSF, or the like) of an optical fiber, transmission distance and wavelength spacing. Accordingly, if these information are known in advance and when only a chromatic dispersion quantity per wave is obtained (measured actually), since the chromatic dispersion quantities of the other channels are determined on the basis of this value as a matter of course, it is possible that the relationship between a correction quantity for a chromatic dispersion quantity corresponding to one channel and a correction value (or an offset value) for a chromatic dispersion quantity of the other channel is previously obtained through simulations or the like (or actually measured) and, on the basis of the relationship therebetween, the control on the variable dispersion compensator for the other channel is implemented through the use of a common control circuit.

(A4) Others

In the case of the above-described basic mode and modifications, although the two-stage compensation is made through the use of the preamplifier 3 and the equalization amplifier 5, it is also acceptable that one-stage compensation is made using one of them (the speed of the compensation characteristic control on one of the preamplifier 3 and the equalization amplifier 5 is changed and controlled by the time constants $\tau 1$ and $\tau 2$).

Moreover, it is also appropriate that the aforesaid clock extractor 6 is constructed with a PLL (Phase Locked Loop) circuit or the like.

(B) Application to Photonic Network

The photonic network enables a tera-bit-class large-capacity transmission through the use of an optical fiber and a wavelength multiplexing technique, and realizes a very-high-rate/broadband transmission by means of multiplexing/demultiplexing, drop/add, cross connect and others based on wavelength at an optical signal stage in a node.

A key element for embodying such a photonic network is an optical node such as OADM (Optical Add-Drop Multiplexing) or OXC (optical Cross Connect). At an input terminal of this optical node, it is considered to employ means to compensate in batch for waveform distortion in an optical signal stage. For example, chromatic dispersion compensation is made through the use of a variable dispersion compensator with a variable dispersion compensation characteristic which batch-controls wavelengths at an optical signal stage, and polarization mode dispersion compensation is made through the use of a polarization controller which can freely control polarization at an optical signal stage.

However, since the wavelength spacing becomes narrow in a very-high-rate/large-capacity optical transmission system as mentioned above, the variable dispersion compensator 5A with a variable dispersion compensation characteristic for batch-controlling wavelengths at an optical signal stage is required to have a strict characteristic, which makes it difficult to put it into practical use, and since the dispersion value of a main signal dropped varies dynamically, difficulty is encountered in realizing the batch compensation at the optical node input terminal.

In addition, as mentioned above, since the influence of the polarization mode dispersion is generally proportional to the square of transmission rate and is proportional to the root (square root) of the transmission distance, it is very difficult to disregard the influence of the waveform degradation stemming from the chromatic dispersion or the polarization mode dispersion on the drop side or through side of an optical node.

A description will be given hereinbelow of an example of realizing waveform compensation at an output terminal of an optical node.

(B1) Application to OADM

The OADM is one of network elements constituting a photonic network, and is an optical node mainly used for a ring-like network. For example, as FIG. 18 shows, this apparatus drops some wavelength light of a wavelength-multiplexed optical signal, sends out a new signal to be added in the node itself to an idle wavelength, and passes a signal unnecessary to the node itself through.

Figure 18:
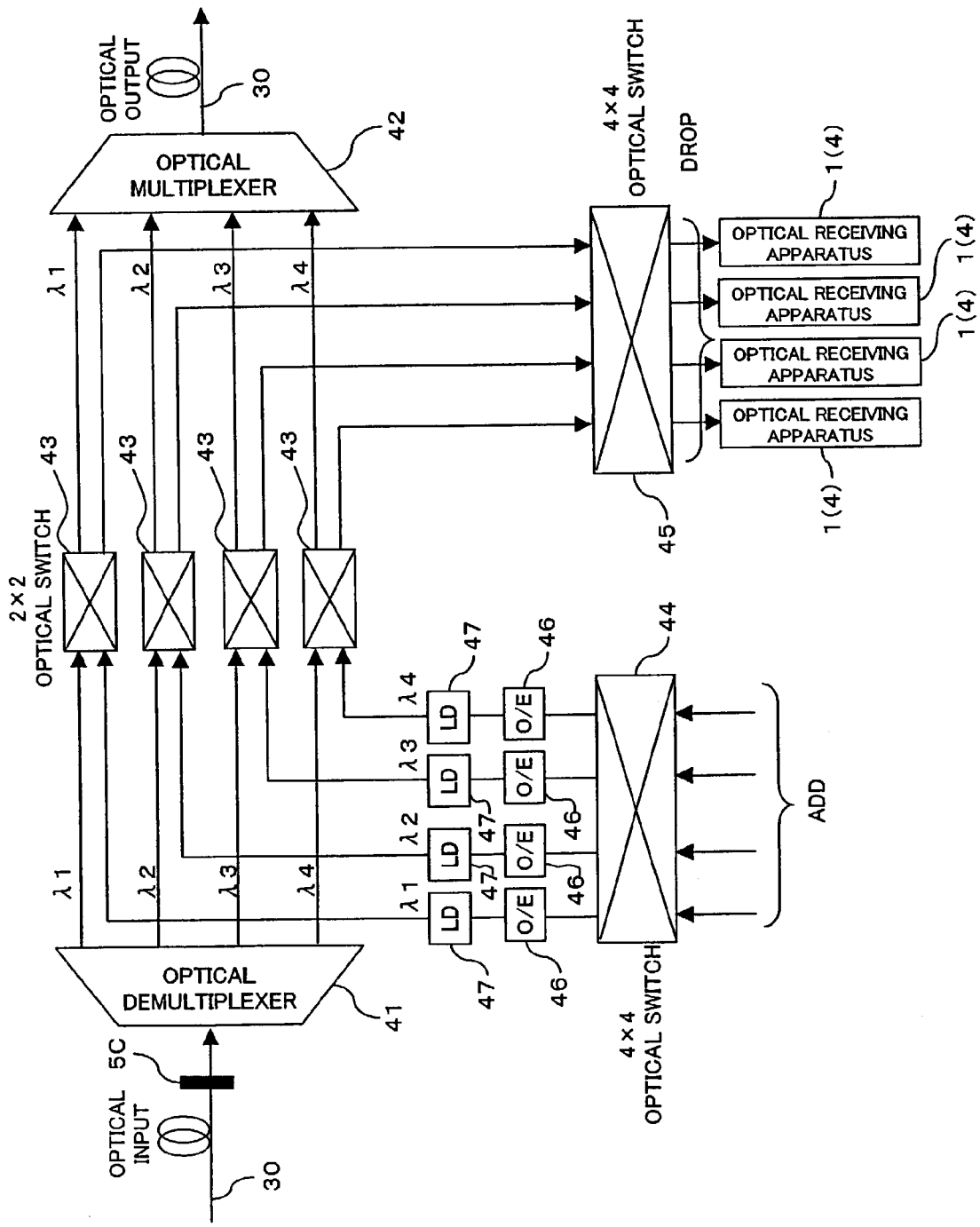
FIG. 18 is a block diagram showing a configuration in which the optical receiving apparatus shown in FIG. 1, 15 or 16 is applied to OADM.

In FIG. 18, the aforesaid add/drop function is realized by 2×2 optical switches 43 for the respective channels, interposed between an optical demultiplexer 41 for demultiplexing a received WDM signal according to wavelength ($\lambda 1$, $\lambda 2$, $\lambda 3$, $\lambda 4$) and an optical multiplexer 42 for wavelength-multiplexing the lights having the wavelengths $\lambda 1$, $\lambda 2$, $\lambda 3$ and λ4, with the number of the 2×2 optical switches 43 corresponding to the number of wavelengths (in this case, four wavelengths of λ1, λ2, λ3 and λ4).

That is, each of these 2×2 optical switches 43 permits, for example, 1) a cross connection in which two inputs and two outputs are connected in a cross fashion, 2) a bar connection in which two inputs and two outputs are connected in a parallel fashion, and 3) a broadcast connection in which one of two inputs (one connected to the optical demultiplexer 41) is connected to two outputs, and realizes the add/drop function by the cross connection, the through function by the bar connection and the drop/through function by the broadcast connection.

In addition, a 4×4 optical switch 44 provided on the add side is made to conduct the input/output switching for transmitting a new optical signal to be added through the use of a light with an arbitrary wavelength of λ1, λ2, λ3 or λ4, and the optical signal after the switching is once converted into an electric signal in a photoelectric converter (O/E) 46, and then wavelength-converted into light with the add wavelength of λ1, λ2, λ3 or λ4 in the corresponding laser diode (LD) and sent out to the 2×2 optical switch 43.

On the other hand, a 4×4 optical switch 45 provided on the drop side is made to conduct the input/output switching for sending out the optical signal dropped in the 2×2 optical switch 43 to an optical receiving apparatus 1 (optical receiver 4) corresponding to the arbitrary wavelength λ1, λ2, λ3 or λ4.

When the optical receiving apparatus 1 (optical receiver 4) described above with reference to FIG. 1, 15 or 16 is used at an optical signal branching point in this way, it is possible to compensate for the waveform degradation of a received signal stemming from the chromatic dispersion or polarization mode dispersion with high accuracy at an electric signal stage as described above, thus not only enlarging the dynamic range with respect to the waveform degradation (or enlarging the waveform degradation compensable range) but also avoiding an extreme increase in cost at the system construction or in management cost, and even improving the extensibility (applicability) and the flexibility at the system reconstruction or the like.

In this connection, it is also appropriate that, as shown in FIG. 18, a dispersion compensator 5C (the compensation characteristic can be either variably set or fixed) for batch-compensating for the chromatic dispersion of an optical signal is placed at the former stage of the optical demultiplexer 41. In this case, the waveform degradation compensation is achievable in both of the optical stage and electric stage, thus enlarging the dynamic range with respect to the waveform degradation (or enlarging the waveform degradation compensable range).

(B2) Application to OXC

Figure 19:
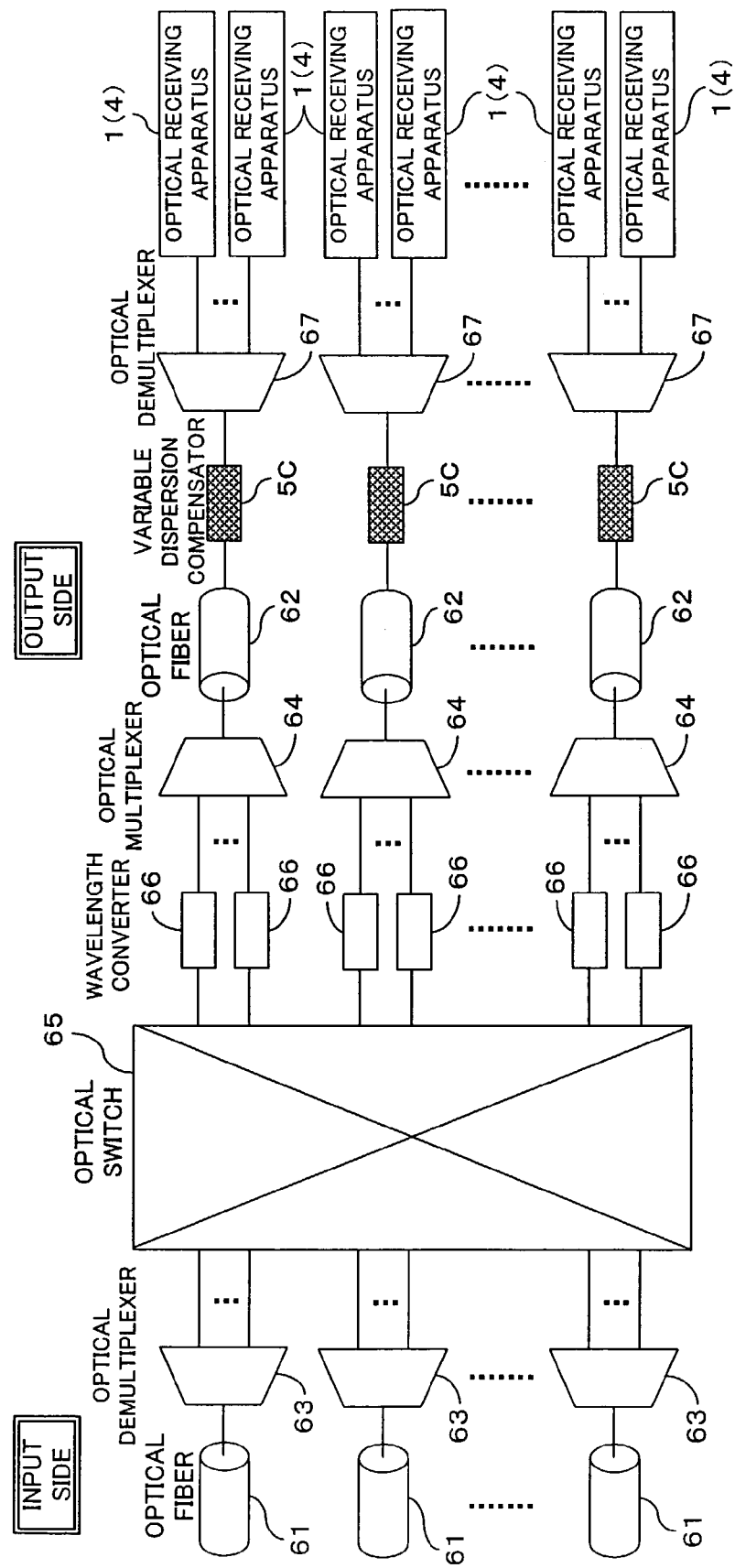
FIG. 19 is a block diagram showing a configuration in which the optical receiving apparatus shown in FIG. 1, 15 or 16 is applied to OXC.

The OXC is one of network elements constituting a photonic network and an optical node principally applied to a mesh-like network. For example, as FIG. 19 shows, this apparatus is made up of a plurality of input optical fibers (optical transmission lines) 61, a plurality of output optical fibers (optical transmission lines) 62, a plurality of optical demultiplexers 63, a plurality of wavelength converter 66, a plurality of optical multiplexers 64 and an optical switch 65. The optical demultiplexer 63 demultiplexes a WDM signal, transmitted through the input optical fiber 61, according to wavelength and, after the optical switch 65 switches their routes according to wavelength, the optical multiplexer 64 again wavelength-division-multiplexes them and sends out the wavelength-division-multiplexed signal to the output optical fiber (optical transmission line) 62.

In this configuration, the wavelength converter 66 has a function to convert an input wavelength into an arbitrary output wavelength for the purpose of preventing the collision between optical signals with the same wavelength received from a different input optical fiber 61. The route switching in the optical switch 65 is made in units of optical fibers, or is made in units of wavelengths in the optical fibers (optical path editing, path switching).

In addition, as FIG. 19 shows, at an output terminal of this OXC, the optical receiving apparatus 1 (optical receiver 4) described above with reference to FIG. 1, 15 or 16 is put to use after the wavelength demultiplexing in each of optical demultiplexers 67. This can compensate accurately for the waveform degradation of a received signal stemming from the chromatic dispersion or polarization mode dispersion in an electric stage. Also in this case, it is possible to not only enlarge the dynamic range with respect to the waveform degradation (or enlarging the waveform degradation compensable range) but also avoid an extreme increase in cost at the system construction or in management cost and even improve the extensibility (applicability) and the flexibility at the system reconstruction or the like.

Also in this configuration, if a dispersion compensator 5C for batch-compensating for the chromatic dispersion at an optical signal stage is placed at the former stage of the optical demultiplexer 67, the waveform degradation compensation is achievable in both of the optical stage and electric stage, thus enlarging the dynamic range with respect to the waveform degradation (or enlarging the waveform degradation compensation range). Also in this case, the compensation characteristic of the chromatic dispersion compensator 5C can be either variably set or fixed, and if it is variably set, one variable dispersion compensator 5C can be controlled by the optical receiving apparatus 1 (optical receiver 4) for one wave (for example, see FIG. 17).

It should be understood that the present invention is not limited to the above-described embodiments, and that it is intended to cover all changes and modifications of the embodiments of the invention herein which do not constitute departures from the spirit and scope of the invention. For example, although in the above-described embodiment the present invention is applied to an optical receiving apparatus, the present invention is also applicable to a receiving apparatus of a radio terminal or a receiving apparatus of a wire transmission system.

What is claimed is:

1. A receiving apparatus with a waveform degradation compensating function, comprising:

first waveform degradation compensating means of a compensation characteristic variable type for compensating for waveform degradation of a received signal;

second waveform degradation compensating means of a compensation characteristic variable type for further compensating for waveform degradation of an output of said first waveform degradation compensating means;

received waveform measuring means for measuring waveform data on said received signal (which will be referred to hereinafter as "received waveform data");

control means for controlling compensation characteristics of said first and second waveform degradation compensating means so that a difference between frequency data obtained by converting said received waveform data, acquired by said received waveform measuring means, into a frequency domain and frequency data on a reference waveform free from waveform degradation reaches a minimum; and time-constant generating means for making a difference between a speed of the control of said compensation characteristic of said first waveform degradation compensating means by said control means and a speed of the control of said compensation characteristic of said second waveform degradation compensating means by said control means.

2. A receiving apparatus with a waveform degradation compensating function according to claim 1, wherein said time-constant generating means includes:
a first time-constant generating circuit having a first time constant; and
a second time-constant generating circuit having a second time constant different from said first time constant,
said first time-constant generating circuit being provided between said first waveform degradation compensating means and said control means, and
said second time-constant generating circuit being provided between said second waveform degradation compensating means and said control means.

3. A receiving apparatus with a waveform degradation compensating function according to claim 2, wherein said first waveform degradation compensating means is constructed with a preamplifier having, as said compensation characteristic, a variable frequency/phase characteristic, and said second waveform degradation compensating means is constructed with an equalization amplifier having, as said compensation characteristic, a variable frequency/phase characteristic.

4. A receiving apparatus with a waveform degradation compensating function according to claim 2, wherein said second time constant is larger than said first time constant.

5. A receiving apparatus with a waveform degradation compensating function according to claim 1, wherein said time-constant generating means includes:
a first time-constant generating circuit having a first time constant; and
a second time-constant generating circuit having a second time constant different from said first time constant,
said first and second time-constant generating circuits being located between said received waveform measuring means and said control means.

6. A receiving apparatus with a waveform degradation compensating function according to claim 5, wherein said first waveform degradation compensating means is constructed with a preamplifier having, as said compensation characteristic, a variable frequency/phase characteristic, and said second waveform degradation compensating means is constructed with an equalization amplifier having, as said compensation characteristic, a variable frequency or phase characteristic.

7. A receiving apparatus with a waveform degradation compensating function according to claim 5, wherein said second time constant is larger than said first time constant.

8. A receiving apparatus with a waveform degradation compensating function according to claim 1, wherein said received waveform measuring means includes:
a first received waveform measuring circuit for measuring first received waveform data from an output of said first waveform degradation compensating means; and
a second received waveform measuring circuit for measuring second received waveform data from an output of said second waveform degradation compensating means, and
said control means includes:
a first control circuit for controlling said compensation characteristic of said first waveform degradation compensating means so that a difference between frequency data obtained by converting said first received waveform data, acquired by said first received waveform measuring circuit, into a frequency domain and frequency data on a reference waveform free from waveform degradation reaches a minimum; and
a second control circuit for controlling said compensation characteristic of said second waveform degradation compensating circuit so that a difference between frequency data obtained by converting said second received waveform data, acquired by said second received waveform measuring circuit, into a frequency domain and frequency data on a reference waveform free from waveform degradation reaches a minimum.

9. A receiving apparatus with a waveform degradation compensating function according to claim 8, wherein said time-constant generating means includes:
a first time-constant generating circuit having a first time constant; and
a second time-constant generating circuit having a second time constant different from said first time constant,
said first time-constant generating circuit being located between said first waveform degradation compensating means and said first control circuit, and
said second time-constant generating circuit being located between said second waveform degradation compensating means and said second control circuit.

10. A receiving apparatus with a waveform degradation compensating function according to claim 8, wherein said first waveform degradation compensating means is constructed with a preamplifier having, as said compensation characteristic, a variable frequency or phase characteristic, and said second waveform degradation compensating means is constructed with an equalization amplifier having, as said compensation characteristic, a variable frequency or phase characteristic.

11. A receiving apparatus with a waveform degradation compensating function according to claim 9, wherein said first waveform degradation compensating means is constructed with a preamplifier having, as said compensation characteristic, a variable frequency or phase characteristic, and said second waveform degradation compensating means is constructed with an equalization amplifier having, as said compensation characteristic, a variable frequency or phase characteristic.

12. A receiving apparatus with a waveform degradation compensating function according to claim 9, wherein said second time constant is larger than said first time constant.

13. A receiving apparatus with a waveform degradation compensating function according to claim 1, wherein said first waveform degradation compensating means is constructed with a preamplifier having, as said compensation characteristic, a variable frequency or phase characteristic, and said second waveform degradation compensating means is constructed with an equalization amplifier having, as said compensation characteristic, a variable frequency or phase characteristic.

14. A receiving apparatus with a waveform degradation compensating function according to claim 1, wherein said first and second waveform degradation compensating means are constructed as a common waveform degradation compensating means.

15. A receiving apparatus with a waveform degradation compensating function according to claim 14, wherein said common waveform degradation compensating means is constructed with one of a preamplifier and an equalization amplifier each having, as said compensation characteristic, a variable frequency or phase characteristic.

16. A receiving apparatus with a waveform degradation compensating function according to claim 1, wherein said received waveform measuring means includes:
   an equivalent-time sampling unit for equivalent-time-sampling said received signal to acquire a plurality of wave-height data on said received signal;
   a waveform data recording unit for recording, as said received waveform data, said wave-height data acquired by said equivalent-time sampling unit; and
   a time-weighting unit for time-weighting sampling timings in said equivalent-time sampling unit to make the wave-height data sampling timings have dense and sparse conditions.

17. A receiving apparatus with a waveform degradation compensating function, comprising:
   a demultiplexing unit for receiving a wavelength-multiplexed optical signal, produced by multiplexing a plurality of kinds of wavelengths, from an optical transmission line to demultiplex said wavelength-multiplexed optical signal according to wavelength;
   optical waveform degradation compensating means of a compensation characteristic variable type for compensating for waveform degradation of said wavelength-multiplexed optical signal;
   a plurality of electric waveform degradation compensating means of a compensation characteristic variable type provided with respect to a specified wavelength of at least one wave of optical signals obtained by the demultiplexing in said demultiplexing unit for compensating for waveform degradation a received signal suffers after photoelectric conversion of the optical signal;
   received waveform measuring means for measuring waveform data on said received signal (which will be referred to hereinafter as "received waveform data");
   control means for individually controlling compensation characteristics of said optical waveform degradation compensating means and said electric waveform degradation compensating means so that a difference between frequency data obtained by converting said received waveform data, acquired by said received waveform measuring means, into a frequency domain and frequency data on a reference waveform free from waveform degradation reaches a minimum; and
   time-constant generating means for making a difference between a speed of the control of said compensation characteristic of said optical waveform degradation compensating means by said control means and a speed of the control of the compensation characteristic of each of the electric waveform degradation compensating means by said control means.

18. A receiving apparatus with a waveform degradation compensating function according to claim 17, wherein said received waveform measuring means includes:
   an equivalent-time sampling unit for equivalent-time-sampling said received signal to acquire a plurality of wave-height data on said received signal;
   a waveform data recording unit for recording, as said received waveform data, said wave-height data acquired by said equivalent-time sampling unit; and
   a time-weighting unit for time-weighting sampling timings in said equivalent-time sampling unit to make the wave-height data sampling timings have dense and sparse conditions.

* * * * *